United States Patent [19]

Robertson et al.

[11] Patent Number: 5,316,397
[45] Date of Patent: May 31, 1994

[54] MARKING APPARATUS WITH MULTIPLE MARKING MODES

[75] Inventors: John A. Robertson, Chillicothe; David L. Cyphert, Canal Winchester; Joseph Muscarella, Columbus; Robert N. French, Chillicothe, all of Ohio

[73] Assignee: Telesis Marking Systems, Inc., Circleville, Ohio

[21] Appl. No.: 923,267

[22] Filed: Jul. 31, 1992

[51] Int. Cl.⁵ .................................................. B41J 3/12
[52] U.S. Cl. ..................................... 400/121; 400/127; 400/130; 101/3.1
[58] Field of Search .................. 400/121, 127, 3.1, 128, 400/129, 130, 131, 132, 133, 134, 134.2, 134.3

[56] References Cited

U.S. PATENT DOCUMENTS

| | | | |
|---|---|---|---|
| 4,506,999 | 3/1985 | Robertson et al. | 400/127 |
| 4,713,887 | 12/1987 | Kitamura | 346/139 D |
| 4,808,018 | 2/1989 | Robertson et al. | 400/121 |
| 5,015,106 | 5/1991 | Robertson et al. | 400/121 |

FOREIGN PATENT DOCUMENTS 1597556 10/1990 U.S.S.R. .................. 346/139 D

Primary Examiner—Edgar S. Burr
Assistant Examiner—John S. Hilten
Attorney, Agent, or Firm—Mueller and Smith

[57] ABSTRACT

Marking apparatus and method is described wherein an array of marker pins are carried by translational assembly which, in turn, is driven from stepper motors which perform in conjunction with high helix lead angle lead screws. Solenoid actuated pneumatic valves are employed to actuate the marker pins within an array thereof and the entire assemblage of motors, valves, translational mechanism, and control features are retained within a compact housing structure. The control system and associated translational mechanism is capable of driving the marker head assembly in matrix, raster, and continuous modes of operation. Speed of marking is enhanced through the employment of a masking procedure wherein the translational mechanism drives the marker head assembly only to locations where active character forming pixels are present.

29 Claims, 26 Drawing Sheets

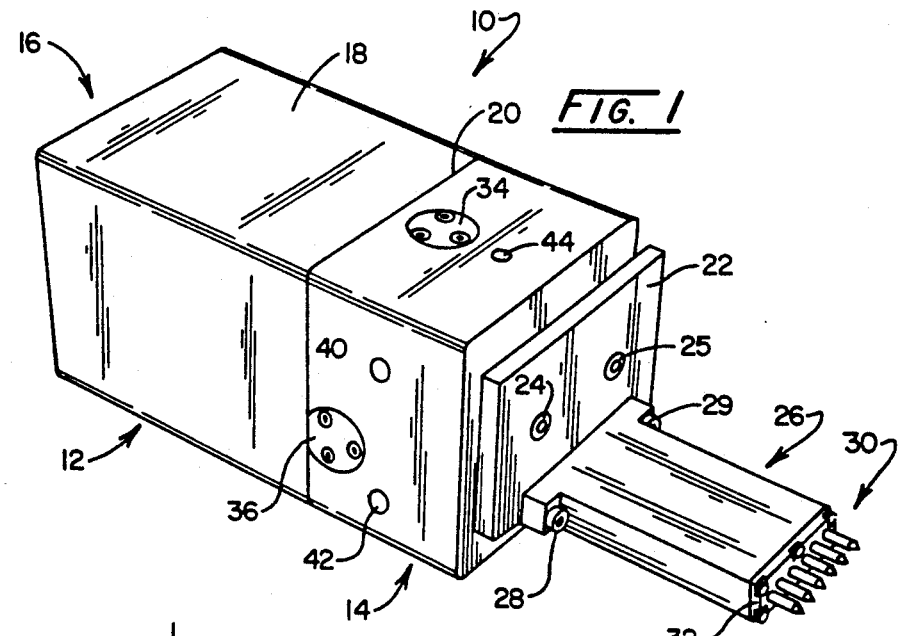
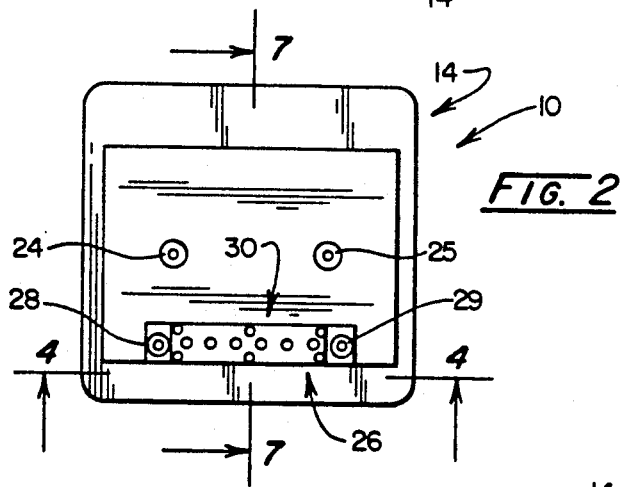
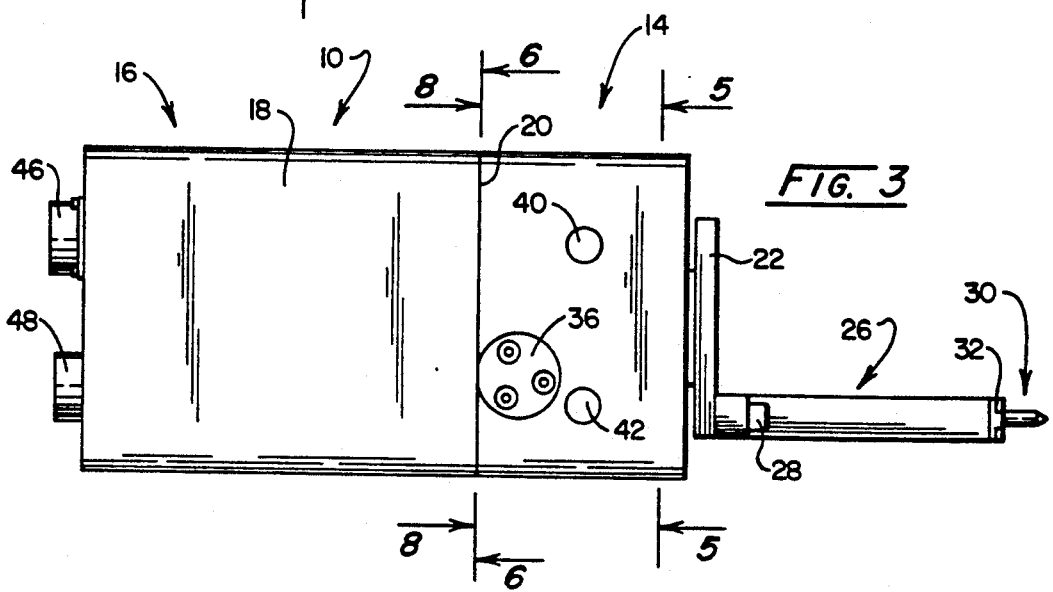

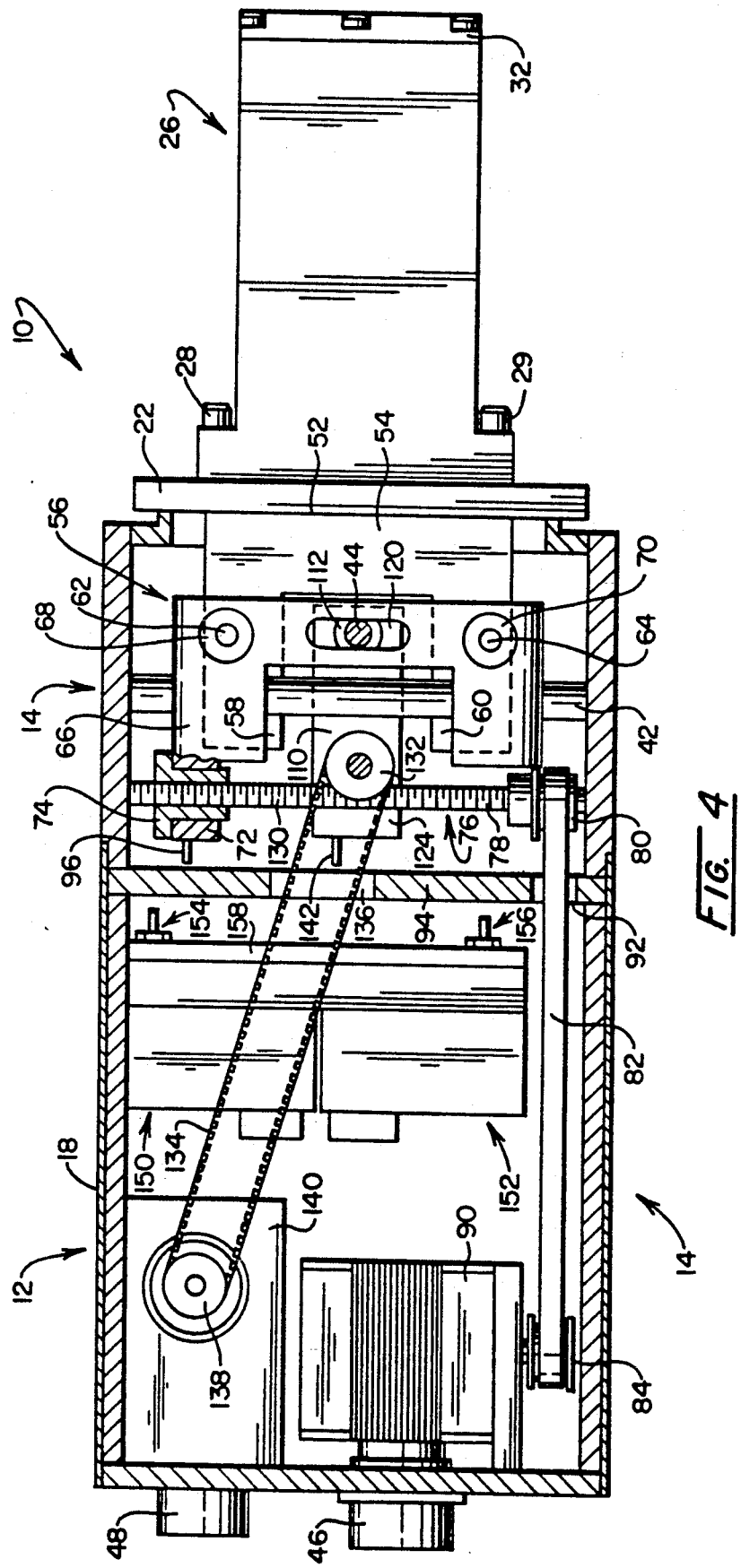

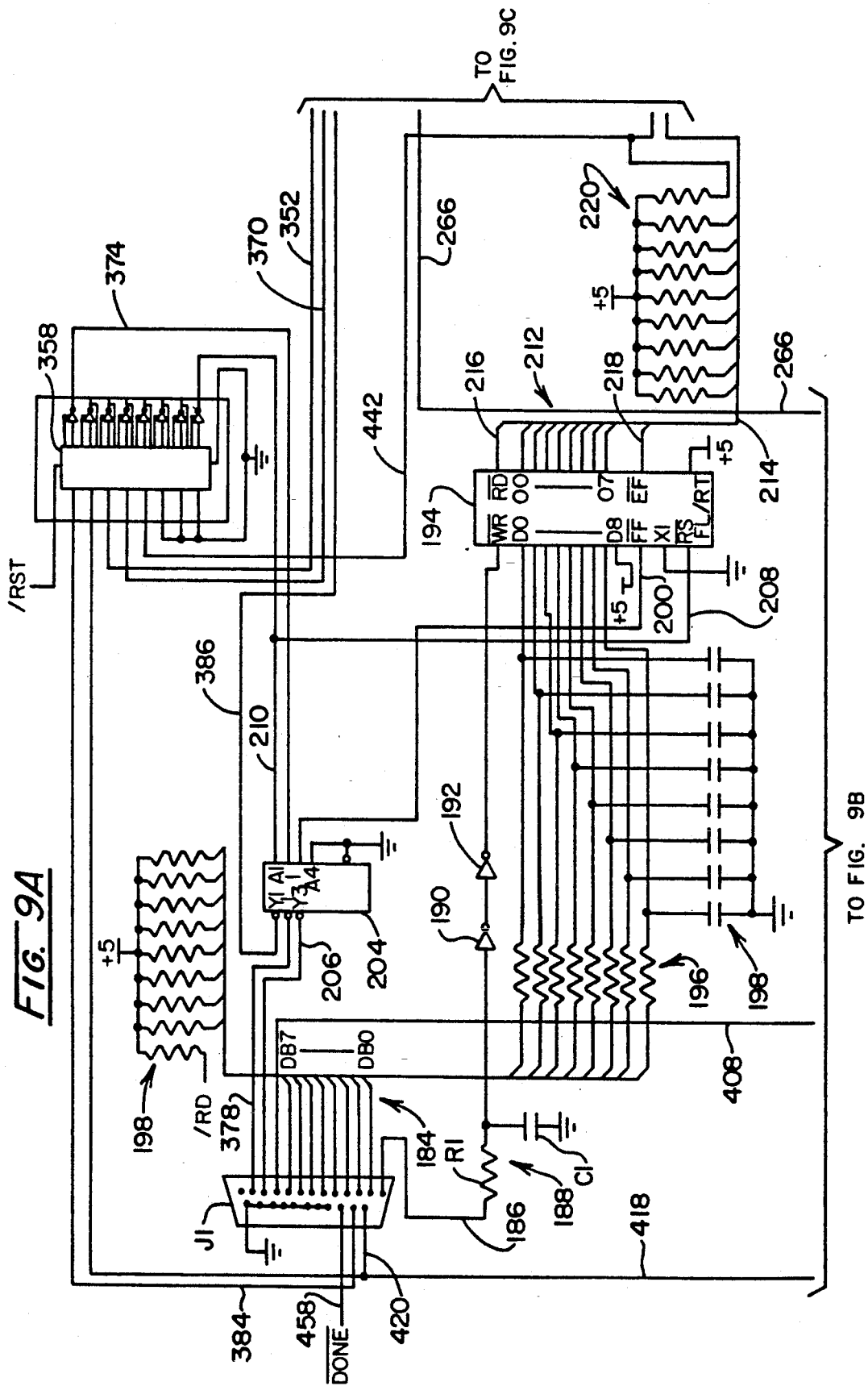

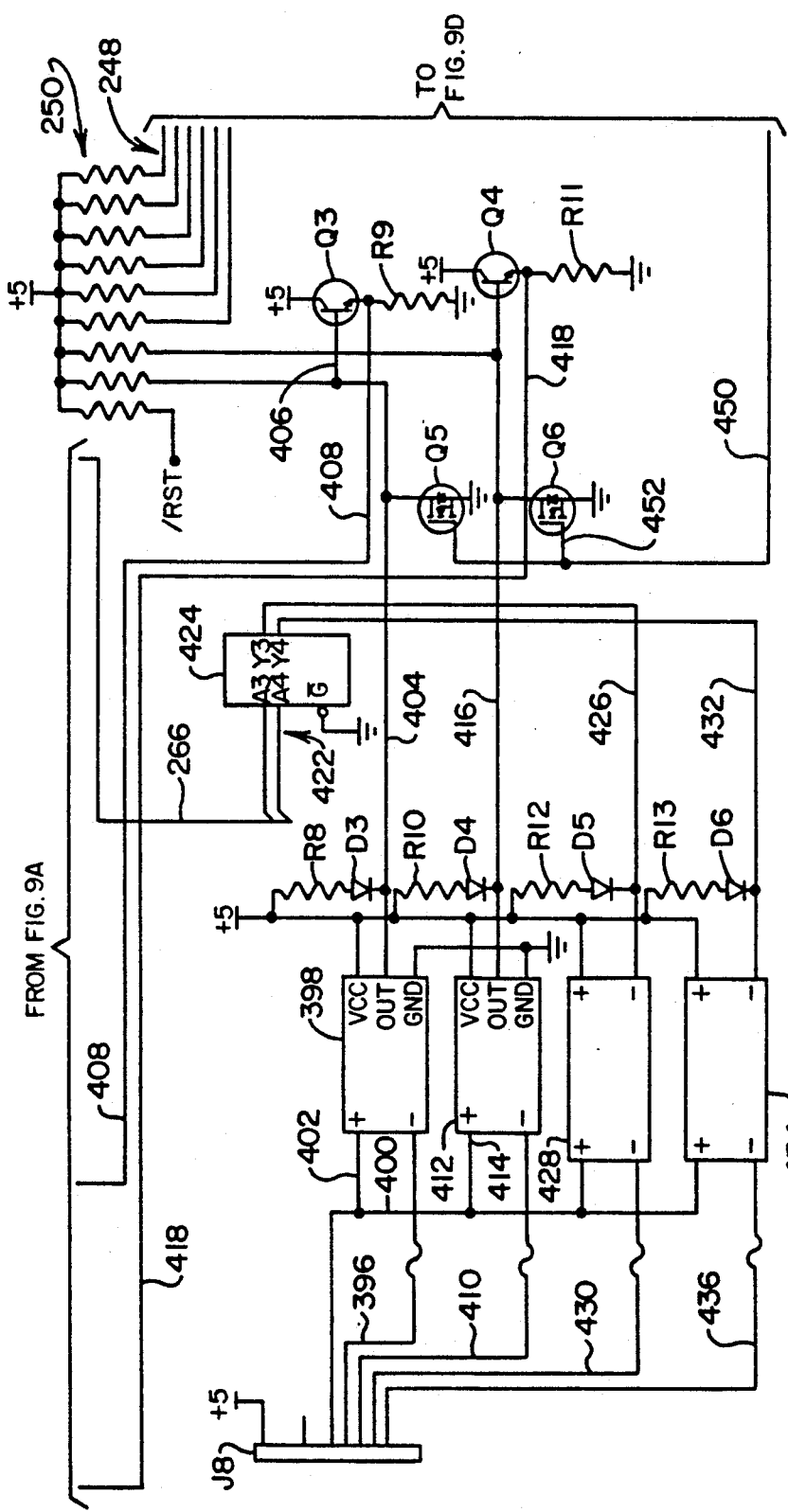

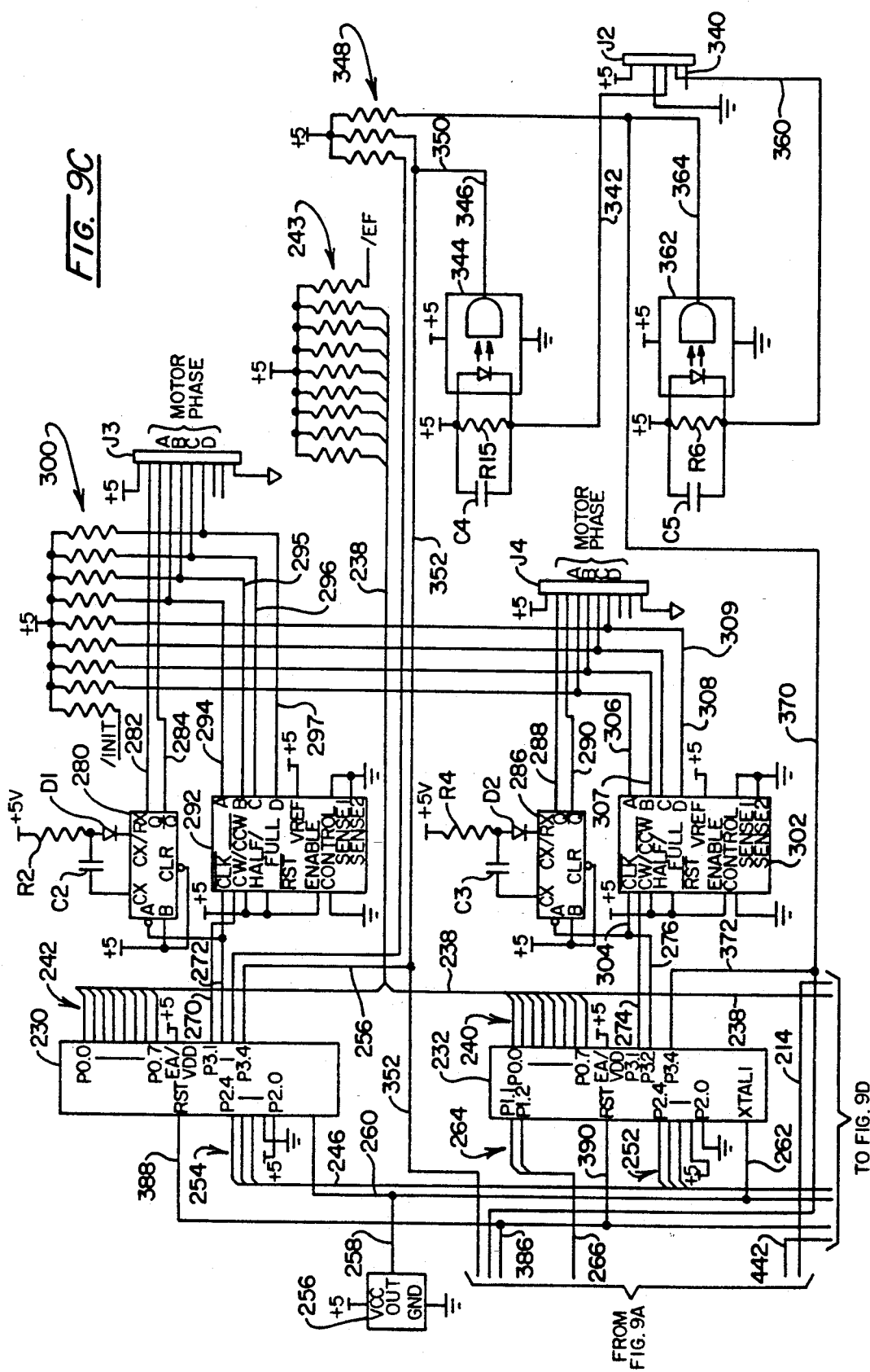

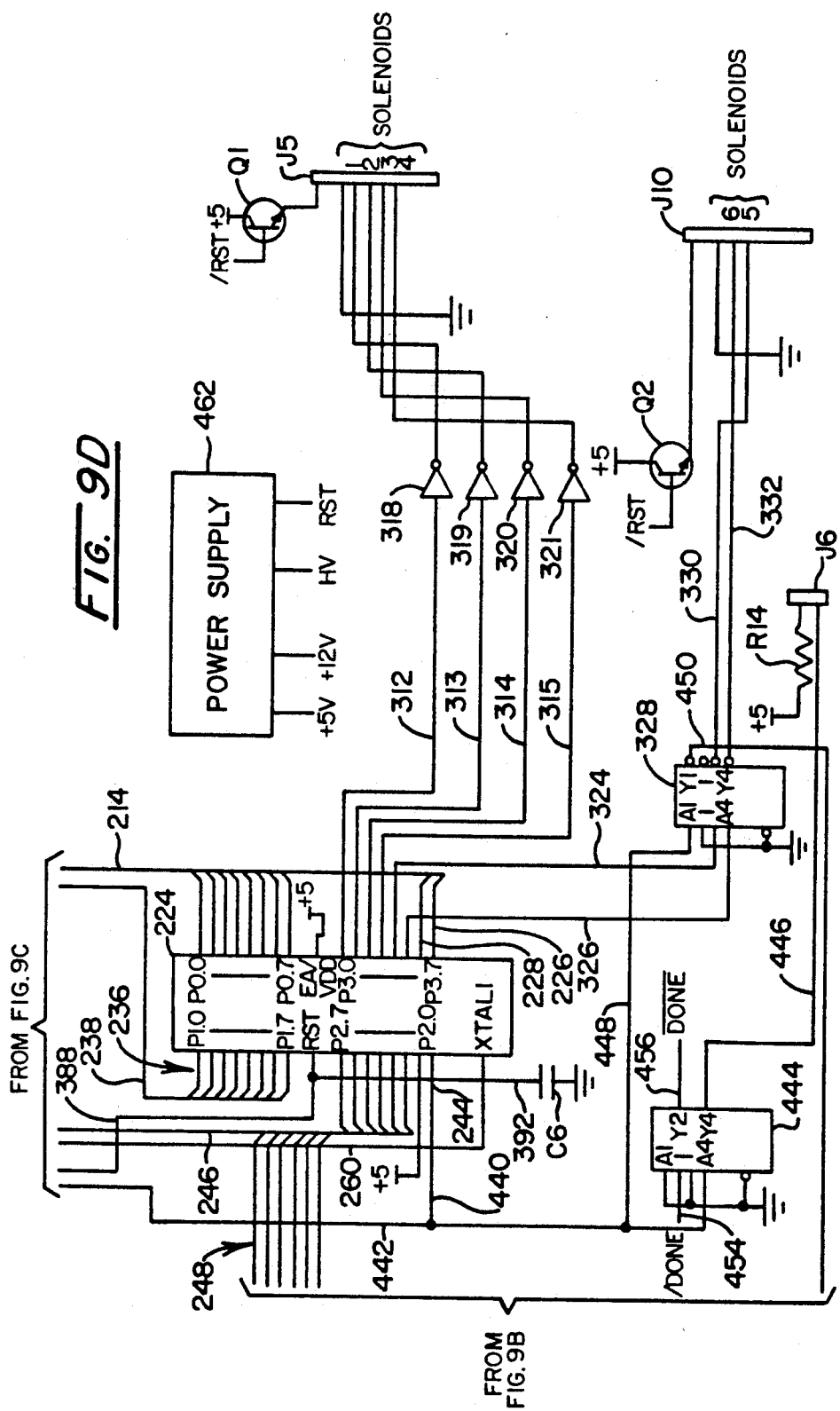

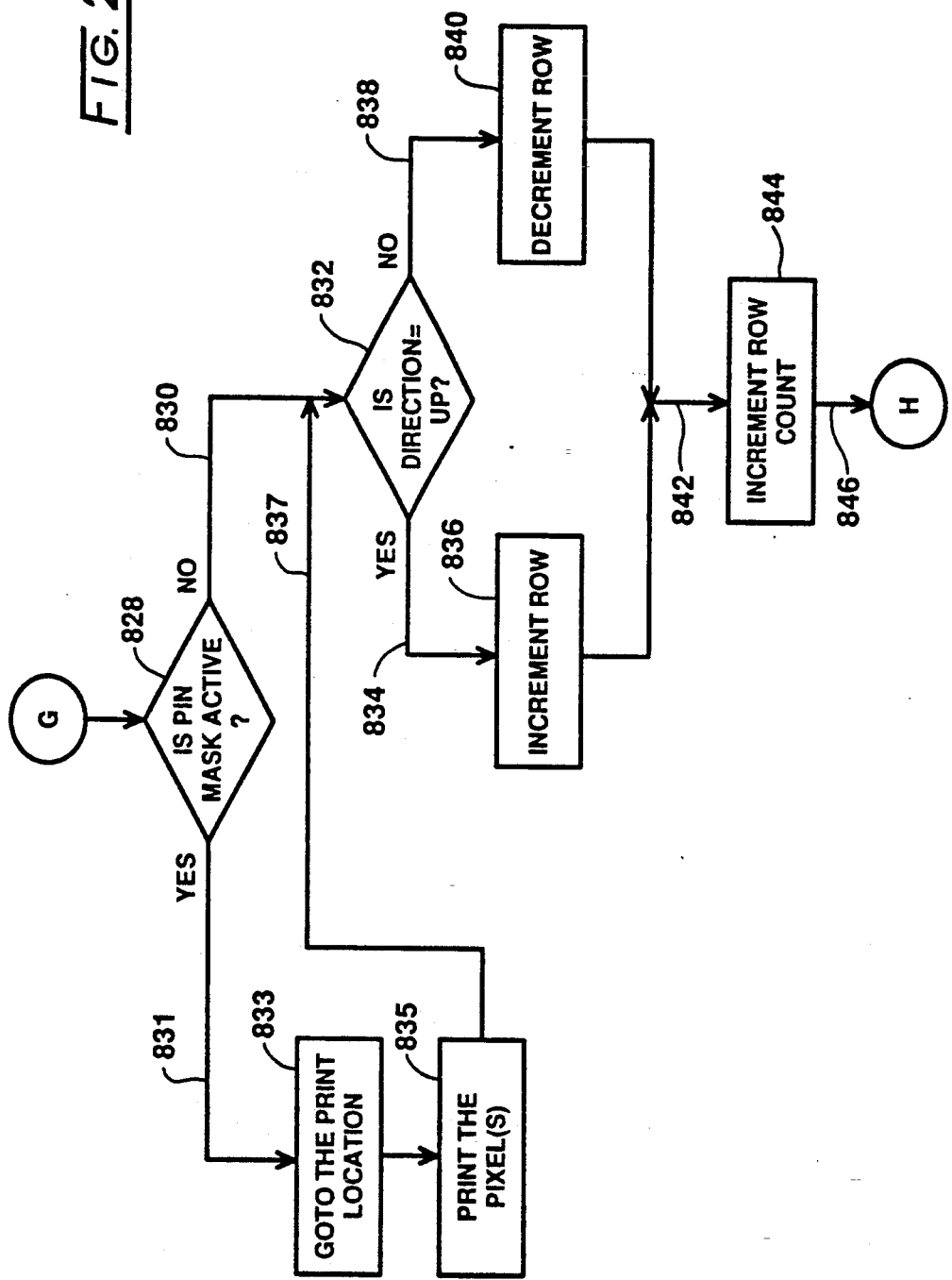

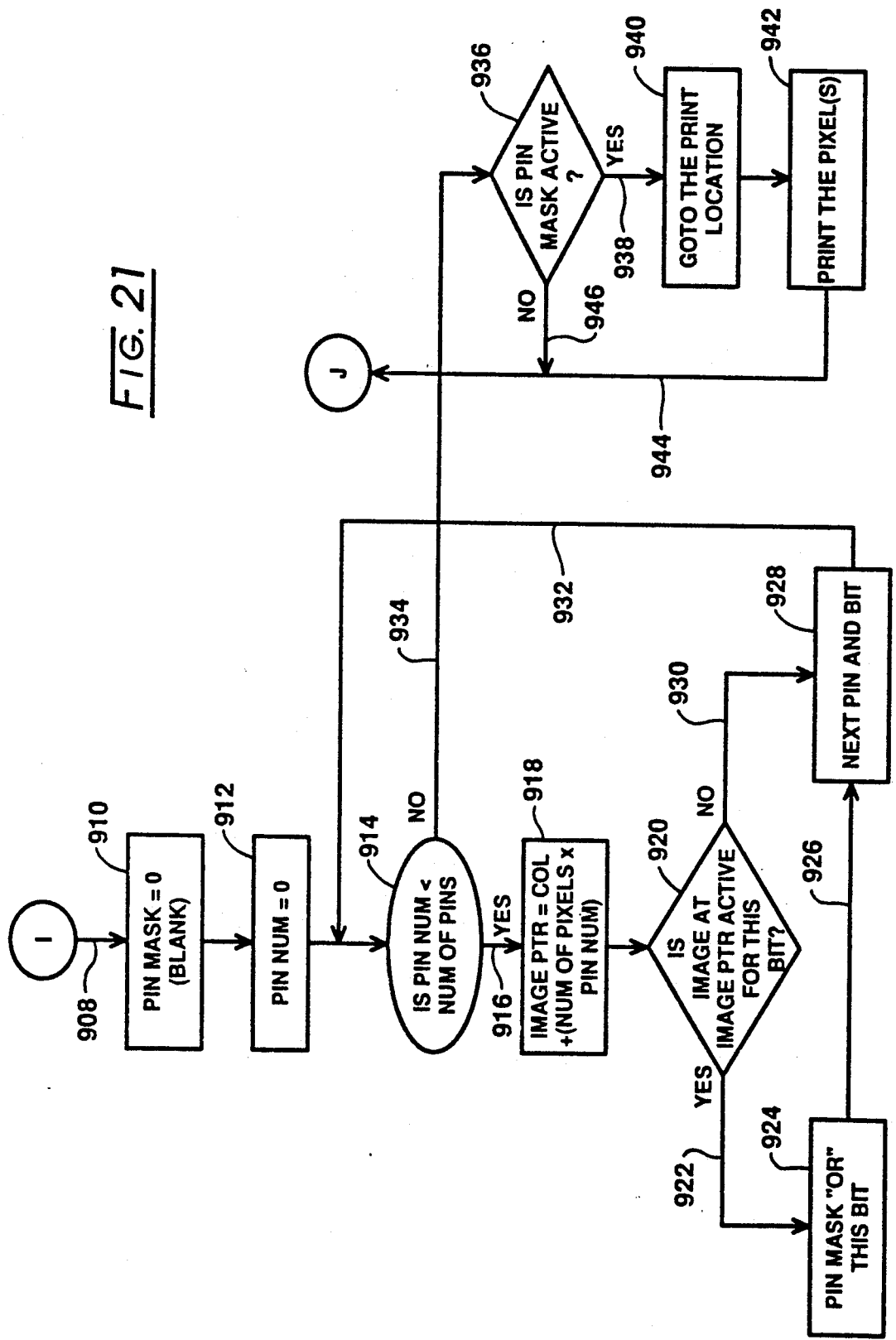

FIG. 22E

- Q
- 2034: DUE TO FACT THAT THE ACTUAL X TRAVEL RANGE MAY BE GREATER THAN THE PIN SPACING, WE MUST ALLOW ACCESS TO THIS REGION WHICH EXTENDS BEYOND THE LAST PIN
- 2036: IS THE REQUIRED "PIN" THE PHANTOM ONE BEYOND LAST PIN?
  - NO → 2050
  - YES → 2038
- 2040: IS PIN LOCATION X LESS THAN (MAX X - PIN SPACING)?
  - NO → 2052
  - YES → 2042
- 2044: GO BACK TO THE LAST PIN BY SHIFTING "PIN" ONE BIT TO THE RIGHT
- 2046: ADD THE PIN SPACING BACK TO THE PIX LOCATION X
- 2048
- 2050: IS "PIN" EQUAL TO OR GREATER THAN BEYOND LAST PIN?
  - YES → 2062
  - NO → 2068
- 2064: OUT OF REACH FLAG SET BECAUSE REQUIRED PIN DOES NOT EXIST AND X LOCATION IS OUT OF REACH
- 2066
- R

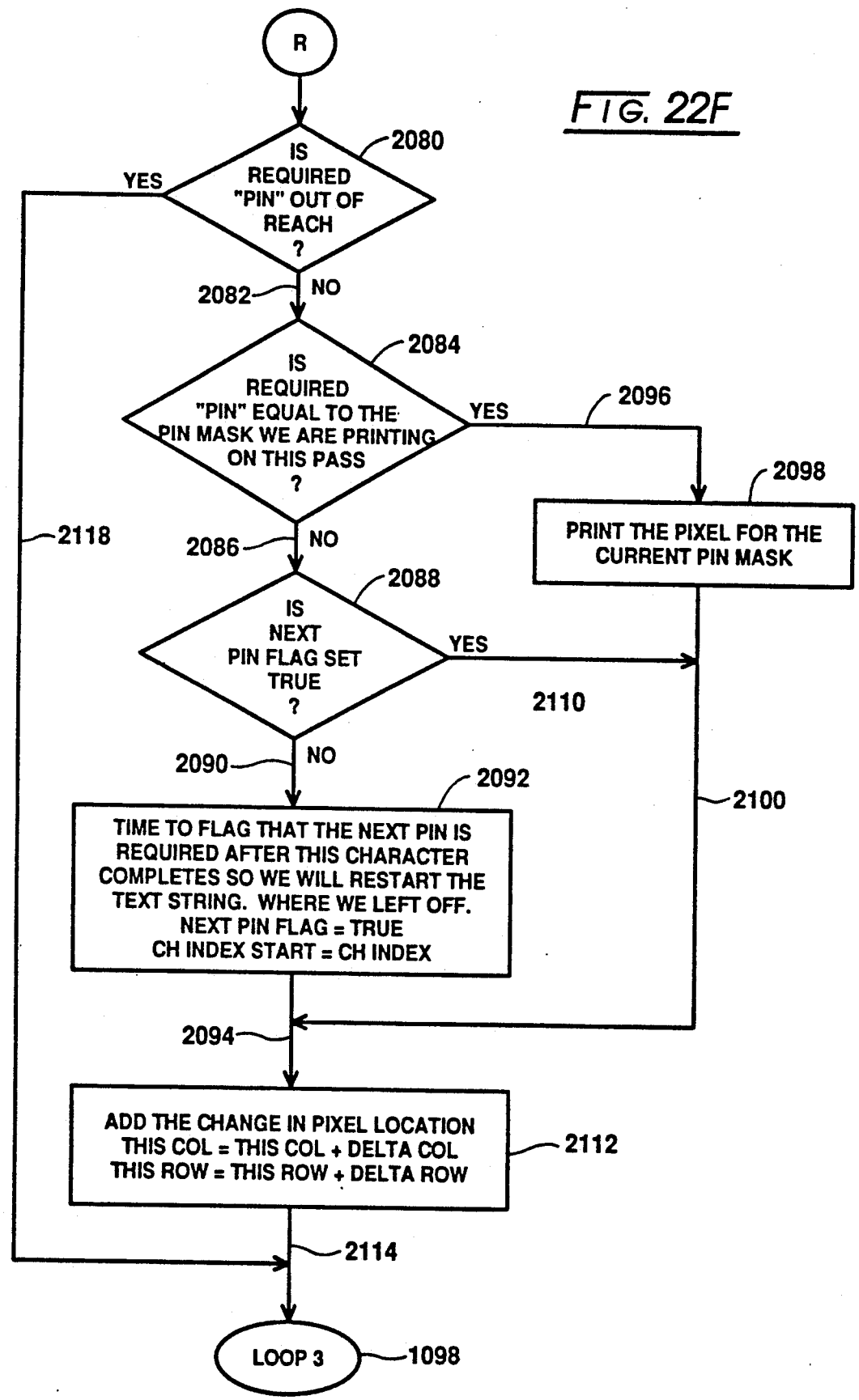

MARKING APPARATUS WITH MULTIPLE MARKING MODES

BACKGROUND

As industry has continued to refine and improve production techniques and procedures, corresponding requirements have been levied for placing identifying, data related markings upon components of manufactured assemblies. With such marking, the history of a product may be traced throughout the stages of its manufacture and components of complex machinery such as automobiles and the like may be identified, for example, in the course of theft investigation.

A variety of product marking approaches have been employed in the industry. For example, paper tags or labels carrying bar codes may be applied to components in the course of their assembly. For many applications, such tags or labels will be lost or destroyed. Ink or paint spraying of codes such as dot matrix codes have been employed for many manufacturing processes. Where the production environment is too rigorous, however, or subsequent painting steps are involved, such an approach would be found to be unacceptable.

The provision of a permanent or traceable marking upon hard surfaces such as metal traditionally has been achieved with marking punches utilizing dies which carry a collection of fully formed characters. These "full face dies" may be positioned in a wheel or ball form of die carrier which is manipulated to define a necessarily short message as it is dynamically struck into the material to be marked. As is apparent, the necessarily complex materials involved are prone to failure and full face dies exhibit rapid wear. Generally, the legibility and abrasion resistance of the resultant marks can be considered to be only fair in quality. Additionally, the marking punch approach is considered a poor performer in marking such surfaces as epoxy coatings and the like.

Laser activated marking systems have been employed. However, such systems are of relatively higher cost and the abrasion resistance and "readability after painting" characteristics of laser formed characters are considered somewhat poor.

In 1985, U.S. Pat. No. 4,506,999 by Robertson, entitled "Program Controlled Pin Matrix Embossing Apparatus" described and claimed a computer driven dot matrix marking technique which had been successfully introduced into the marketplace. This marking approach employs a series of tool steel punches which are uniquely driven using a pneumatic floating pin impact concept to generate man readable and/or machine readable dot characters or codes. Marketed under the trade designation "PINSTAMP", these devices carry the noted steel punches or "pins" in a head assembly which is moved relative to the workpiece being marked in selected skew angles to indent a dot or pixel defining permanent message or code into a surface. The approach enjoys the advantage of providing characters of good legibility as well as permanence. Additionally, a capability for forming the message or codes during forward or reverse head movements is realized. This approach permits marking upon such surfaces as epoxy coatings. Use of the basic dot matrix character stamping device is limited, however, to piece parts which are both accessible and of adequate size.

Robertson, et al., in U.S. Pat. No. 4,808,018, entitled "Marking Apparatus with Matrix Defining Locus of Movement", issued Feb. 28, 1989, describes a dot matrix character impact marking apparatus which is capable of forming messages or arrays of characters within a very confined region. With this device, a linear array of marker pins is moved by a carriage in a manner defining an undulating locus of movement. This locus traces the matrix within which character fonts are formed by the marker pin. The carriage and head containing the marker pin are pivotally driven by a cam to provide vertical movement and by a Geneva mechanism to provide horizontal movement. Pixel positions for the matrices are physically established in concert with pin or carriage locations by a timing disk and control over the pins is generated in conjunction with an interrupt/processor approach. Each marking pin within the head assembly of this portable device is capable of marking more than one complete character for a given traverse of the head between its limits of moment.

Robertson, et al., in U.S. Pat. No. 5,015,106, issued May 14, 1991, and entitled "Marking Apparatus with Multiple Line Capability" describes a dot matrix character impact marking apparatus which achieves a multiple line capability wherein a carriage component carrying one or more marker pin cartridges moves within a singular plane locus of movement. This multiple line capability advantageously has permitted a broad variety of line configurations, for example in widely spaced positions at a workpiece. The device further employed a retrace method in generating a locus of marking movement somewhat similar to the formation of a raster in conjunction with television systems. A modular approach for the device was provided utilizing a forward housing carrying the locus defining component of the device which was then actuated from a rearwardly disposed motor containing housing component which served to drive cam assemblies at the forward portion. The carriage component of the device carried a manifold which, in turn, carried one or more marker pin cartridges, the pins of which were driven from an externally disposed valved and pressurized air supply. As before, the device performed in conjunction with a predetermined character defining matrix of pixel positions, each position of the matrix being identified to the system by a timing disk physically maneuvered with the drive components.

The success of the above products has led to further calls on the part of industry for even more compact marking systems of lower weight and higher rates of marking speed. Further, interest has developed in providing a broad range of marking capabilities for the type devices at hand. In this regard, it has been deemed desirable to achieve a matrix form of character marking utilizing a single plane undulatory motion of the pin cartridge carrying carriage, as well as providing a capability for the above-described raster form of locus of movement. This flexibility should be achievable through the utilization of software changes as opposed to the insertion of hardware-based timing components and the like. Further, it is desirable that the instruments providing for such marking be both alterable and repairable by field based personnel. A still further call has been made on the part of industry for such devices to retain the capability for full form character formation. This requires the actuation of the marker pins in a manner wherein discrete dots or pixels are not observable, the indentations formed by these pins being so closely nested as to evoke the image of a continuous line forming each character. As is apparent, A need has existed for marker pin based systems exhibiting enhanced levels of marking flexibility and compactness.

SUMMARY

The present invention is addressed to a marking method and apparatus of a variety employing an array of marker pins which exhibits a flexibility in providing multiple modes of marking operation, including matrix, raster, and continuous modes, while achieving a highly desirable compact configuration. Of these marking modes, the matrix and raster modes are carried out under a control procedure wherein strings of matrix defined characters are formed within significantly improved marking intervals. The mechanical performance of the apparatus is enhanced through the utilization of high helix angle lead screw drives in conjunction with the translational mechanism carrying and maneuvering a marker head assembly. As a consequence, the mechanism is able to accommodate signal drive input derived at higher sequential rates. Configuration compactness is achieved even through pneumatic control components have been mounted with a translational mechanism and its associated motor drives within a singular apparatus. Marking efficiency further has been enhanced through development of a capability for "splicing" the assigned marking duties of adjacent marking pins within a marker pin array such that they share the pixel formation of a single character within a character string.

Marking interval time for a given field or character string is improved through the implementation of a control feature wherein, for either the raster or matrix marking modes, the marker head assembly moves only to locations where a marker pin is positioned at an active, character forming pixel. To achieve enhanced stability during these latter modes of operation, a control feature is provided wherein the simultaneous actuation of two or more marker pins is avoided. This serves to, in turn, avoid the destabilizing dynamic effects of multiple simultaneous marker pin actuation. As another feature, the invention provides apparatus for marking objects at a surface thereof with a sequence of characters formed by indentation in response to data inputs. The apparatus comprising a housing having forward and rearward portions. A translation mechanism is mounted at the housing forward portion having a carrier assembly slidably movable only in a transverse direction in response to a transverse drive input, a transverse screw assembly fixedly mounted upon and supported for rotation by the housing forward portion and rotatable in response to a rotational transverse drive input to provide the carrier assembly transverse drive input. A coupler component is fixedly mounted to and supported by the housing forward portion for slidable movement only in a vertical direction in response to a vertical drive input. A vertical screw assembly is fixedly mounted upon and supported for rotation by the housing forward portion and is rotatable in response to a rotational vertical drive input to provide the coupler component vertical drive input. A carriage component is connected with the coupler component for driven movement in the vertical direction while being slidably movable thereon in the transverse direction, and is connected with the carrier assembly for driven movement in the transverse direction while being slidably movable thereon in the vertical direction. A marker head assembly is connectable with the carriage component and has a confronting portion which is positionable in spaced adjacency with the surface and includes at least two marker pins, each having an impact tip drivably movable into the surface in response to pneumatic control inputs. A first motor is mounted within and fixed to the housing rearward portion is responsive to a first control input to provide a transverse drive output of rotational extent corresponding with the first control input. A first transmission arrangement is connected in driven relationship with the transverse drive output and in drive relationship with the rotational transverse drive input for effecting the transverse directional movement of the carriage component. A second motor is mounted within and fixed to the housing rearward portion which is responsive to a second control input to provide a vertical drive output of rotational extent corresponding with the second control input and a second transmission arrangement is connected in driven relationship with this vertical drive output and in drive relationship with the rotational vertical drive input for effecting the vertical directional moment of the carriage component. A control arrangement is responsive to the data inputs for deriving the first control input, the second control input, and for effecting generation of the pneumatic control inputs to effect derivation of the characters at the surface.

As another feature, apparatus is provided for marking a surface in response to data inputs with pixel characters formed within a matrix of rows and columns, the columns being mutually spaced to define a transverse pixel-to-pixel spacing. The apparatus comprises a housing and a translational mechanism is mounted upon the housing having a positioning component movable in vertical and transverse directions in response to a drive input. A marker head assembly is provided which is connectable with the positioning component and has a confronting portion positionable in adjacency with the surface and includes first and second marker pins having a predetermined pin-to-pin spacing, each having an impacting tip drivably movable into the surface in response to a pin drive input. A translation drive assembly is responsive to position signals for moving the positioning component to successive positions orienting the first and second marker pins at locations corresponding with a pixel. A marker pin drive arrangement responds to pin actuation signals for providing the pin drive input and a control arrangement is responsive to the value of the pixel-to-pixel spacing, and the value of the pin-to-pin spacing to provide the pixel-to-pixel spacing as an amount sufficient to constitute the quotient of the value of the pin-to-pin spacing divided by the pixel-to-pixel spacing to be substantially an integer for deriving the pin actuation signals and the position signals to effect the formation of the characters exhibiting adjusted pixel-to-pixel spacing.

As another feature, the invention provides a method for marking a surface in response to data inputs with pixel-based characters formed within a matrix of rows and columns representing available pixel locations comprising the steps of:

providing a housing;

providing translation mechanism mounted upon the housing having a position component, the translation mechanism being actuable to move the positioning component in vertical and transverse directions between corresponding vertical end positions and transverse end positions;

providing a marker head assembly connected with the translation mechanism positioning component, having a confronting portion and an array of at least two marker pins, mutually spaced a predetermined pin-to-pin distance, each movable within a unique marking cell periphery defined by the positioning component transverse and vertical end positions, each having a compacting tip extensible from the confronting portion when actuated to form indentations in the surface at active pixel locations representing a component of the characters;

positioning the confronting portion in adjacency with the surface;

determining a locus of movement pattern for the array of marker pins representing a movement of each marker pin to each available pixel location of the matrix;

determining the active pixel locations along the locus of movement pattern with respect to each marker pin;

actuating the translation mechanism to move the positioning component in the vertical and transverse directions to cause the marker pins to move along the locus of movement pattern, movement in one direction being limited to the distance required to move any marker pin of the array in the one direction to next encountered active pixel; and actuating the marker pin to form an indentation when the marker pin is located at the active pixel location.

Still another feature of the invention provides an apparatus for marking objects at a surface thereof with a sequence of pixel-based characters, formed by indentation, in response to data inputs. The apparatus comprises a housing and a translation mechanism mounted within the housing having a positioning component movable in vertical and transverse directions in response to a drive input. A marker head assembly is connectable with the positioning component, having a confronting portion positionable in adjacency with the surface and including an array of marker pins, each having an impacting tip and actuable to move into the surface in response to a pin drive input. A translation drive assembly is responsive to position signals for moving the positioning component to successive positions orienting the marker pins for forming the characters, and a marker pin drive arrangement is responsive to pin actuation signals for providing the pin drive input. A control arrangement is provided which is responsive to the data inputs for providing the drive input to position the array of marker pins for the formation of portions of the pixel-based characters at a sequence of positions, and deriving the pin actuation signals for each position in a sequence providing a predetermined time interval therebetween to effect a timed succession of the actuations of the marker pins.

Another feature of the invention provides marking apparatus for forming characters at the surface of an object by the select applications of current from a power source to the inputs of a sequence of inductive loads in response to control inputs. The apparatus comprises a power application switch connectable between the power source and the inductive load inputs and which is responsive to a drive input to apply power source derived current to the inputs. A pulse drive circuit is provided which is responsive to a pulse width control input to derive the drive input. Additionally provided is a power selection switch arrangement which includes a sequence of solid-state selection switches, each having a selection output connectable in circuit completing relationship with the inductive load inputs and each having a gate input responsive to a gate input signal to transition from an initial to a gated condition to activate a corresponding selection output thereof for effecting the select application of current through an inductive load. A sensing arrangement is provided which is coupled with each of the power selection switch arrangement selection output for deriving a sense signal corresponding with the cumulative value of the current applied therethrough. A gate drive arrangement is coupled with each gate output of the solid state selection switches and is responsive to the control inputs for deriving each gate input signal. A summing arrangement is coupled with each solid state selection switch for deriving a summing signal having a value corresponding with the number of the solid state selection switches exhibiting a gated condition. A pulse width control arrangement responds to the summing signal and the sense signal for deriving the pulse width control input.

Other features of the invention will, in part, be obvious and will, in part, appear hereinafter.

The invention, accordingly, comprises the apparatus and method providing the construction, combination of elements, arrangement of parts, and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a perspective view of apparatus according to the invention;

FIG. 2 is a front view of the apparatus of FIG. 1;

FIG. 3 is a side view of the apparatus of FIG. 1;

FIG. 4 is a sectional view taken through the plane 4—4 in FIG. 2;

FIGS. 9A-9D combine as labeled thereon to provide an electrical schematic diagram of a controller function employed with the apparatus of FIG. 1;

FIGS. 14 through 21 combine as represented by the node designations illustrated thereon to provide a flow chart describing a control program employed with the apparatus of FIG. 1; and FIGS. 22A-22H combine as a flow chart describing a program for operating the apparatus of the invention in a continuous line operational mode.

DETAILED DESCRIPTION OF THE INVENTION

Figure 5:
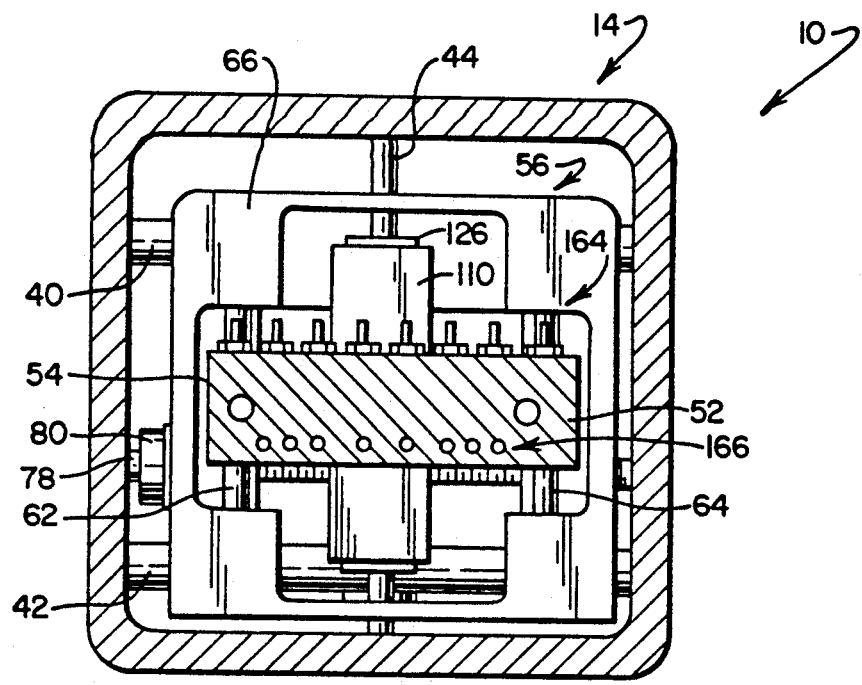
FIG. 5 is a sectional view taken through the plane 5—5 in FIG. 3.

The marking apparatus at hand is of ideally compact configuration permitting its use in marking within closely confined regions of products moving, for instance, within an assembly line. For the utilization of stepper motor drives to a translation mechanism moving a marker head assembly, a substantial flexibility is afforded which not only permits the formation of characters in three modes of operation, but also achieves substantial marking time interval savings, an aspect found particularly valuable within a production line industrial environment. The noted operational modes include a matrix technique for forming characters wherein the marking head is driven within a selectively abbreviated undulating single plane path; a raster form of movement emulating a television raster wherein the marking head moves for marking purposes unidirectionally along rows of matrix defined characters to return to a starting position; and a continuous marking technique where characters are formed in a continuous fashion utilizing a succession of marking pins. Of particular note in connection with the flexibility and speed of marking associated with the system, a control technique permitting "splicing" is achieved such that one marking pin, may mark, for example 2 ⅜ characters, a next adjacent marking pin completing the partially marked character of its neighboring pin.

Referring to FIG. 1, a marking apparatus is represented generally at 10 having a housing 12 seen having a forward portion 14 and a rearward portion 16 as demarcated by the abutment of a rear cover against the back edge of the forward portion 14 at parting line 20. The forward portion 14 of the apparatus 10 supports a rectangular platform 22 which is coupled to an inwardly disposed carriage or positioning component by machine screws 24, 25. Platform 22 includes pneumatic transfer chambers which are directed to the pneumatic inputs and outputs of a marker head represented generally at 26. Marker head 26 is coupled at desired locations to the platform 22 by socket head cap screw 28 and 29 and, for the illustrated embodiment, is seen to support an array 30 of six marking pins, the impacting tips of which may be observed to protrude from a removable confronting portion or plate 32 which is positioned in adjacency with the surface to be marked by actuation of pins 30. This actuation is, for example, in the manner described in the above-noted U.S. Pat. Nos. 4,506,999; 4,808,018; and 5,015,106, each of which are incorporated herein by reference. This forward assemblage additionally is seen in FIG. 2.

FIG. 1 also reveals the cover locations of two of the four angular contact bearings utilized with the apparatus 10 as seen at 34 and 36. Bearing 36 performs, in conjunction with an identical bearing oppositely disposed therefrom to support a transverse screw drive, while bearing 34 operates in conjunction with an identical and oppositely-disposed bearing to support a vertically oriented drive screw. Additionally seen in FIG. 1 are bores retaining parallel horizontal shafts 40 and 42 as well as a stabilizer shaft 44. Shafts 40 and 42 as well as contact bearing 36 additionally are seen in FIG. 3. That figure also reveals an electrical control connector 46 at the rearward face of apparatus 10. A source of pressurized gas, for example a pneumatic input also may be introduced to the apparatus 10 from that rear face as represented at 48.

Turning to the sectional bottom view of apparatus 10 shown in FIG. 4, the marker head 26 and platform 22 to which it is coupled are seen to be, in turn, coupled to the forwardly disposed face 52 of a generally C-shaped carriage or positioning component 54. Carriage 54 is part of a translation mechanism represented generally at 56. The rearwardly extending and integrally formed legs of the C-shaped carriage 54 are seen in the figure at 58 and 60. These legs 58 and 60 provide for the slidable mounting of the carriage 54 upon respective vertically oriented shafts 62 and 64. These shafts 62 and 64, are in turn, mounted upon and move in a transverse (x-axis) direction with a carrier 66, the lower surface of which is revealed in the figure. Shafts 62 and 64 are mounted utilizing an appropriate adhesive in conjunction with bushings, for example as shown, respectively, at 68 and 70.

Looking momentarily to FIG. 5, the forward face 52 of the carriage 54 is seen, as well as the two vertically oriented shafts 62 and 64, upon which the carriage slidably moves in vertical (y-axis) fashion. Ball bushings (not shown) are employed to enhance this vertical slidability of the carriage 52 and the vertical movement is permitted as the carriage 52 travels in a transverse or X-axis direction with the carrier 66 which, in turn, supports the shafts 62 and 64.

Figure 6:
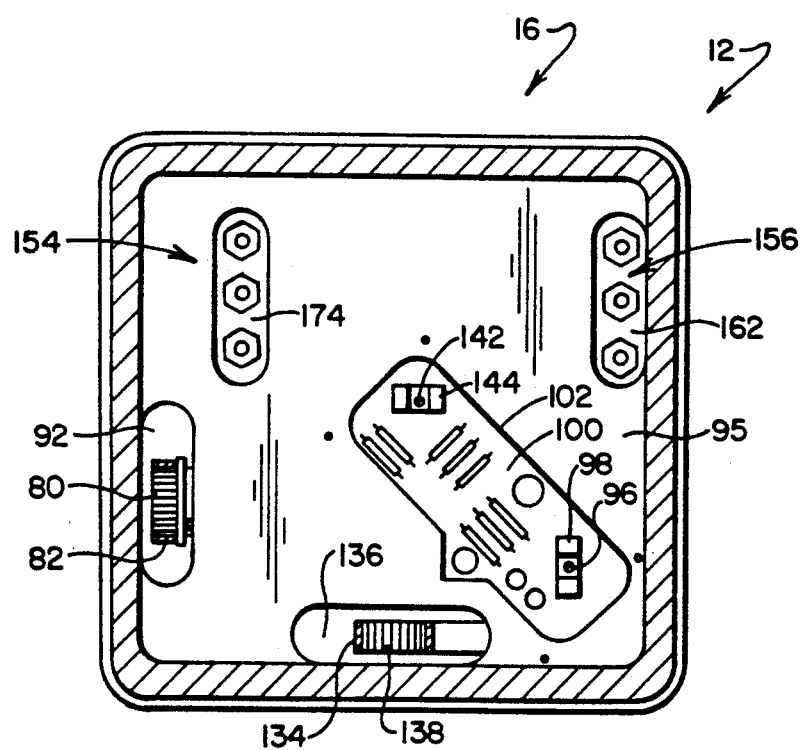
FIG. 6 is a sectional view taken through the plane 6—6 shown in FIG. 3.
Figure 7:
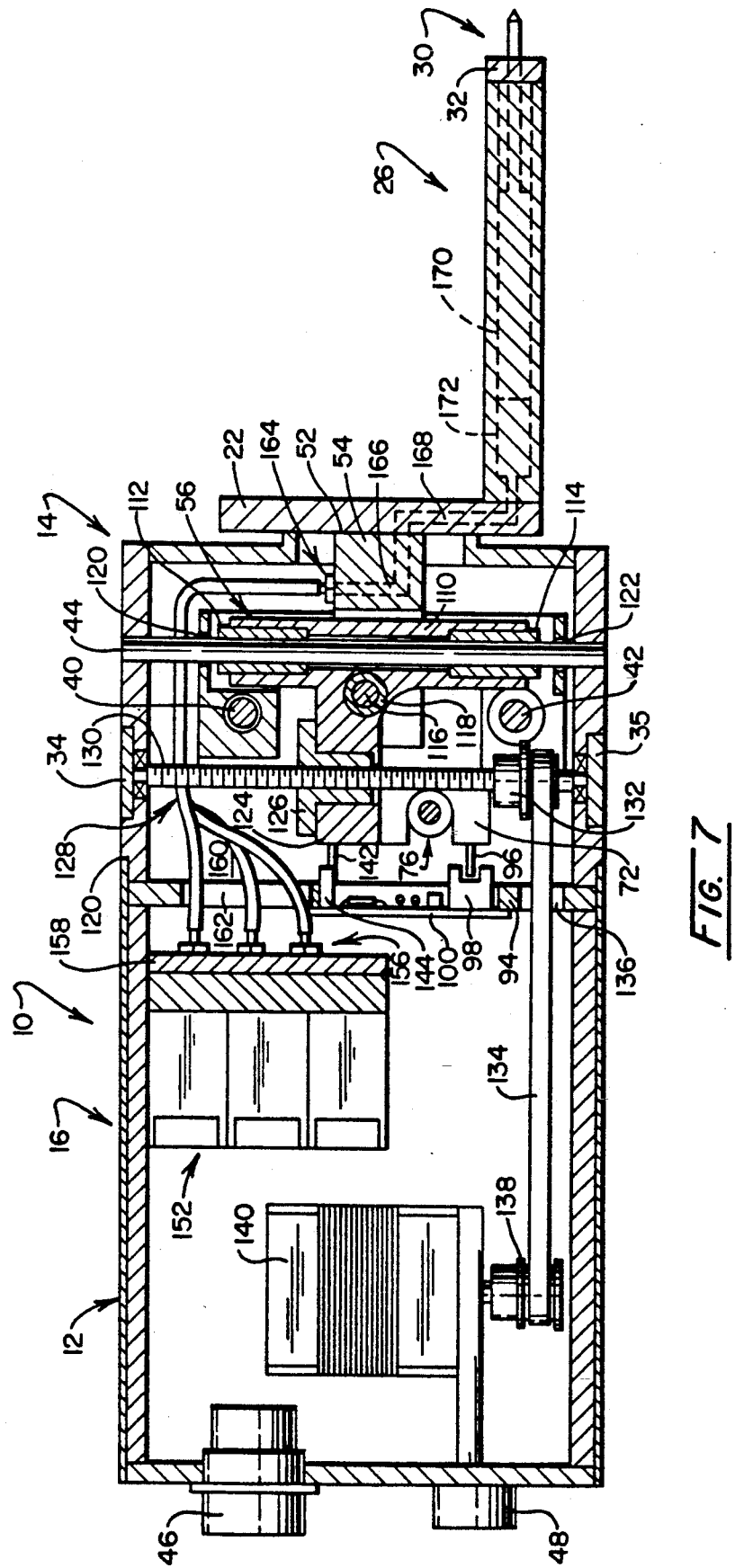
FIG. 7 is a sectional view taken through the plane 7—7 shown in FIG. 2.

Returning to FIG. 4, the carrier 66 is seen to be configured having a rearwardly disposed extension 72 which, in turn, retains a screw nut component 74 of a high helix angle lead screw assembly 76, the screw shaft component of which is represented at 78. Preferably, the threading of this shaft as cooperating with nut 74 will provide for a pitch of about one half inch of travel per revolution of shaft 78. Shaft 78 is mounted between angular contact bearings, one cover location for which has been described in conjunction with FIGS. 1 and 3 at 36. Assembly 76 may be of a variety, for example, marketed by Helitronics, a subsidiary of Winfred M. Berg, Inc. Bi-directional rotational drive is imparted to the shaft 76 by a transmission arrangement including a transverse, X-axis or horizontal drive pulley 80. Pulley 80, in turn, is connected in driven relationship with a flexible drive belt 82, preferably provided, for example, as a neoprene timing belt. Belt 82 extends to the rearward portion 14 of the housing 12 to a drive pulley 84 coupled with the drive output shaft of a stepper motor 90. A pulse width modulated control input to the motor 90 provides for an accurate rotational drive output of pulley 84 which, in turn, drives the belt 82 extending through slot 92 in rear portion forward face 94 to move the drive nut 74 and, in turn, move the carrier 66 in an X-axis or transverse fashion upon horizontal shafts 40 and 42. A thin pin 96 extending from the carrier 66 extension 72 is seen in the figure. Referring additionally to FIG. 6, Pin 96 functions in conjunction with an optical position detector (opto interrupter) 98 mounted (FIG. 6), in turn, upon a circuit board 100 attached to the rearwardly disposed surface of forward face 94. An opening 102 provides for forward access of the components mounted upon the circuit board 100. Circuit board 100 and its related components also are seen in FIG. 7. The opto-interrupter 98 functions to apprise the control system of the apparatus 10 that the carrier 66, and thus the carriage 54, are at a transverse or X-axis row end or terminal position.

Figure 8:
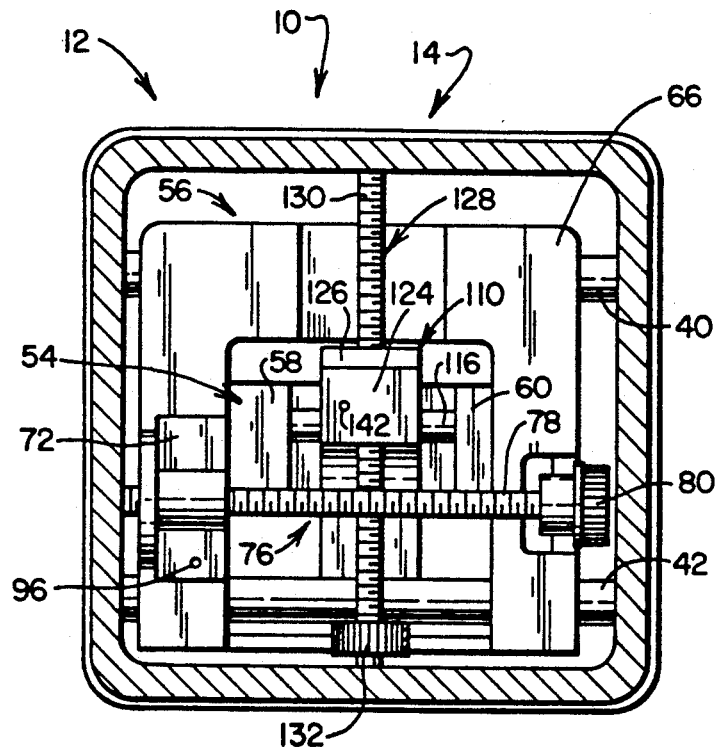
FIG. 8 is a sectional view taken through the plane shown at 8—8 in FIG. 3.

Referring to FIG. 7, a somewhat vertically oriented coupler is represented at 110. Coupler 110 is slidably mounted for vertical movement upon earlier-described vertical shaft 44. Shaft 44, in turn, is seen coupled to the housing 12 forward portion 14. Mounting of device 110 upon the shaft 44 is accomplished using ball bushings as represented at 112 and 114. The vertical movement of coupler 110 is imparted to the carriage 54 by virtue of its slidable connection therewith by a horizontally oriented shaft 116 which, in turn, is slidably retained within a ball bushing 118. Shaft 116 is seen in FIG. 8 to extend between the rearwardly disposed leg components 58 and 60 of the C-shaped carriage 54. To permit the carrier 66 to move in a transverse or X-axis direction, slots are formed in it as shown at 120 and 122. Slot 120 additionally is seen in FIG. 4.

FIGS. 7 and 8 reveal that the coupler 110 has a rearwardly extending stem portion 124 within which is mounted the screw nut 126 of a high helix angle lead screw assembly represented generally at 128. The assembly 128, identical to that at 76, further includes a high helix angle lead screw shaft 130 which is mounted within forward portion 12 of housing 14 upon angular contact bearings (not shown), an upper location for which including a removable cover has been described in conjunction with FIG. 1 at 34 and at FIG. 37 at 34 and 35. Shaft 128 is rotatably driven by a vertical pulley 132, which, in turn, is driven from a vertical drive belt 134. Drive belt 134, preferably provided having a timing belt configuration, extends through a slot 136 within face 94 of rearward housing portion 14 to a driven engagement with a vertical drive pulley 138. Pulley 138, in turn, is driven from a vertical stepper motor 140 which also may be observed to be mounted in the rearward portion 16 of housing 12. Motors 90 and 140 may be provided, for example, as type PK245-01AA marketed by Oriental Motor U.S.A. Corporation.

With the arrangement shown, pulse width modulated activation control input to the motor 140 will cause bi-directional vertical movement of the coupler 110. To locate the upper terminal position of this vertical movement, as before, a thin pin 142 which serves as an optical interrupter is arranged to engage paths through the gap of an optical position detector 144 mounted upon circuit board 100. This latter device is additionally revealed in FIG. 6.

Positioned within rear portion 16 of housing 12 but forwardly of stepper motors 90 and 140 are the six solenoid actuated valves utilized for the purpose of actuating pin array 30 of marking apparatus 26. These valve components are seen in FIG. 4 to be provided as two arrays of three valves 150 and 152. Each of the three valves of the arrays 150 and 152 provide a gas under pressure or pneumatic output at a corresponding three drive air fittings represented, respectively, and generally at 154 and 156 in response to pneumatic control inputs. It may be noted that the valve arrays 150 and 152 are mounted upon a transverse plate or support 158 within housing rearward portion 14. Looking to FIG. 7, the valve array 152 and corresponding array of fittings 156 are revealed. Each of the fittings of array 156 are coupled with a corresponding flexible tube formed, for example, of neoprene and shown in general at 160. This flexible tube array extends through a slot 162 within face 94 and passes over the translation assemblage or mechanism 56 to connect with corresponding fittings mounted upon the forwardly disposed component of carriage 54. An array of pneumatic fittings 164 is seen to be mounted at the upper surface of that forward portion of carriage 54. Carriage 54, as well as associated platform 22, additionally are seen to be bored in manifold fashion, respectively at 166 and 168 to provide chambers in communication with the marker pin assembly 26. In this regard, FIG. 7 reveals one such marker pin in cross-section at 170 positioned within a chamber 172 communicating with the manifold bores 166 and 168. Not seen in the drawing is a return air input to the pin 170 which urges it rearwardly to a stand-by orientation prior to being driven into a surface to be marked.

FIG. 6 shows a similar array of three drive air fittings 154 earlier described in conjunction with FIG. 4. The fittings provide for the positioning of flexible conduit (not shown) extending through a slot 174 within face 94. Looking additionally to FIG. 5, the port components represented in FIG. 7 at 166 are again represented as eight outputs which extend to corresponding bores within the platform 22. The array of fittings 164 as positioned at the top of the forward portion of carriage 54 again is portrayed. Eight such fittings are shown. Six of these fittings are designated as drive air or gas under pressure inputs and the remaining two ports may be utilized for return air inputs.

The control circuitry associated with apparatus 10 is generally comprised of a controller function which is associated with a driver function. This latter driver function may be replicated depending upon the number of solenoid actuated valves utilized and, additionally, for the purpose of driving stepper motors 90 and 140. The controller operation or function is illustrated in conjunction with FIGS. 9A–9D which should be considered in an orientation indicated by the labeling thereon. Data inputs identifying the message or field to be stamped by the apparatus 10 preferably are developed by a conventional personal computer (PC). In the latter regard, and referring to FIG. 9A, a type DB25 parallel connector is identified at J1. This device is connectable with the parallel port of an IBM compatible personal computer. Device J1 is coupled with an 8-bit data bus 182 via eight line lead array 184 having the labeled data components DB0–DB7. Below the array 184 is a line 186 carrying a strobe signal. This signal is generated from the associated PC, in conventional fashion, for the purpose of enabling printer operations. The strobe signal at line 186 is directed through an RC network 188 comprised of resistor R1 and capacitor C1 which functions to carry out a low pass filtering activity. The thus-filtered pulse signal is inverted twice at Schmitt inverters 190 and 192, and is directed to the write terminal, $\overline{WR}$ of a 2K×8 byte first in/first out memory buffer 194 (FIFO). Inverters 190 and 192 serve to improve the strobe signal and may be provided, for example, as type 74HC14, while the FIFO 194 device may be provided, for example, as a DS2011. Data from the controlling PC is introduced to the device 194 at its D0–D8 terminals from the data bus 182. However, as represented by resistor array and capacitor 196 and capacitor array 198, the data from data leads DB0–DB8 first are passed through the resultant RC filter provided by the arrays 196 and 198. These data leads also are seen to be pulled up to +5 v by an array of pull-up resistors 199.

FIFO buffer 194 serves to accommodate the speed of the PC data inputs to the controller electronics of apparatus 10. Thus, the PC inputs or data inputs DB0–DB7 will not overwhelm the latter. Data is written into device 194 by enablement of the write terminal, $\overline{WR}$, while the device may communicate a busy or full signal from its FF terminal via line 200 to the A3 input of a signal buffer 204. The corresponding output from buffer 204 at line 206 derives a busy signal for communication to the PC from connector J1. Device 194 is reset at its $\overline{RS}$ terminal from line 208 which extends, in turn, to line 210 and the A1 input of buffer 204. The data output from FIFO 194 is derived at its O0-O7 terminals via eight lead array 212 which is coupled with and forms part of a master data bus 214. Additionally coupled with bus 214 is a lead 216 carrying a read command and which is coupled to the $\overline{RD}$ terminal of device 194. Further, device 194 provides an empty flag signal to bus 212 from its $\overline{EF}$ terminal at lead 218. The leads of bus 214 carrying master data and deriving from ports O0-O7 of device 194 are pulled up to +5 v at pull-up resistor array 220, whereupon, as represented in FIGS. 9C and 9D, they are introduced to the corresponding terminals P0.0-P0.7 of a master processor 224. Empty flag input from bus 214 is provided to processor 224 via line 226, while the read command therefrom is coupled to bus 214 via line 228. Processor 224 functions to accept all information from the associated PC, whereupon that information is selectively directed to two slave processors shown in FIG. 9C at 230 and 232. In this regard, it may be observed that the slave data ouput of bus 224 emanates from its P1.0-P1.7 ports at eight line lead array 236 forming part of a slave data bus 238.

As seen in FIG. 9C, slave bus 238 extends to eight line lead array 240 connected, in turn, to the P0.0-P0.7 ports of slave microprocessor 232. Bus 238 further extends to the corresponding P0.0-P0.7 ports of slave microprocessor 230, such coupling being developed via eight line lead array 242. These leads as at arrays 240 and 242 carrying slave data inputs are pulled to +5 v from pull-up resistor array 243. Handshake communication between the master processor 224 and slave processors 230 and 232 is developed in conjunction with ports P2.2-P2.7 of master processor 224 which, respectively, carry B BUSY, A BUSY, B SEND, A SEND, B ACKNOWLEDGE, and A ACKNOWLEDGE signals which are directed via six-line lead array 244 forming part of bus 246. These same lines of bus 246 are pulled to +5 v via six line lead array 248 and pull-up resistor array 250 coupled, in turn, to +5 v. Bus 246 is seen in FIG. 9C to be coupled to ports P2.2-P2.4 of slave processor 232 via three line lead array 252. These ports, respectively, communicate B ACKNOWLEDGE, B SEND and B BUSY information. Similarly, ports P2.2-P2.4 of slave processor 230 communicate the A ACKNOWLEDGE, A SEND, and A BUSY signals from device 230 to master processor 224 via three line lead array 245 forming components of bus 246. Processors 224, 230, and 232 may be provided, for example, as type 87C51 microprocessors. They receive a crystal input at their XTAL1 ports from a 12 MHz oscillator seen in FIG. 9C at 256, the output of which at line 258 is directed via lines 260 to the crystal input terminals XTAL .1 of microprocessors 224 and 230 as well as additionally through line 262 to the corresponding terminal of microprocessor 232. Microprocessor 224 also functions in connection with slave processor 232 to develop READY and DONE signals at two lead array 264 which are directed to output components of the circuitry via bus 266. In general, during the handshake procedure between master processor 244 and slave processors 230 and 232, a data byte is applied to the slave data bus 238, whereupon an appropriate low true signal A SEND for microprocessor 230 or B SEND for microprocessor 232 is developed. Master processor 224 then will await a corresponding A ACKNOWLEDGE signal from slave processor 230 or B ACKNOWLEDGE from slave processor 232 indicating that the slave component has received the data byte. The master processor 224 then will raise the SEND signal back to +5 v and the slave then raises the value at the ACKNOWLEDGE port back to +5 v to complete the handshake communication. In this same regard, two signals can be directed to the master processor 224 from slave processors 230 or 232 identified, respectively, as A BUSY or B BUSY communicating to the master device 224 that the slave is incapable of accepting information inasmuch as it is controlling a stepper motor operation. At the termination of this busy signal, the master device 224 is configured then to process vector or head positioning information.

Slave processors 230 and 232 serve the principal function of providing controlling drive output signals to effect the proper actuation of stepper motors 90 and 140. For the purpose of such drive, the outputs of the slave processors involve the provision of directional information and step information. This information is transmitted from the P3.1 and P3.2 terminals, respectively, of the slave processors 230 and 232. In this regard, the direction and step control signals emanate from processor 230 for a stepper motor driving an arbitrarily designated A axis at lines 270 and 272, while the corresponding signals from slave processor 232 are directed through lines 274 and 276 for a stepper motor driving the marking head along an arbitrarily designated B axis. Each axis processor internally creates a ramped velocity profile which accomplishes the desired move in a minimum time. These axes have been described heretofore as "vertical" and "transvers". The step A signal at line 272 is directed via line 278 to the A terminal of a one-shot multivibrator 280. Multivibrator 280, which may be provided, for example, as a type 74123, functions to create a signal which switches from a holding or stop time condition on the relevant stepper motor into a run time mode. In this regard, stepper motors do not require as much current to hold at a steady position as is required for movement response. The time constant of the pulse developed from device 280 is derived from peripherally coupled capacitor C2 and resistor R2. Diode D1 additionally is coupled with this component. The appropriate stop and run output signals from device 280 are developed at respective lines 282 and 284 which, in turn, are directed to respective stop current and run current terminals of a connector J3 providing for the connection of these signals with a driver circuit. In similar fashion, the step B signal at line 276 emanating from slave processor 232 is directed to the A terminal of a one-shot multivibrator 286 which, as before, may be provided as a type 74123. Covering the same function, the device 286 is configured having a pulse output configured with respect to the capacitor C3 and resistor R4 performing in conjunction with a diode D2. The resultant stop current and run current outputs for the designated axis operation are provided, respectively, at lines 288 and 290 to a connector J4 which, as before, is coupled with a driver circuitry.

Returning to slave processor 230, it may be observed that the direction A and step A outputs of respective lines 270 and 272 additionally are directed to the clock, CLK and direction, $CW/\overline{CCW}$ terminals of a stepper motor driver integrated circuit 292. Device 292 may be provided, for example, as a type L297 and provides for output signals representing phase outputs A-D of a conventional stepper motor phase quadrature output drive arrangement. These signals are shown respectively emanating at lines 294-297 which, in turn, are coupled to four pull-up resistors of the pull-up resistor array 300 seen coupled to +5 v. The A-D motor phases then extend to connector J3 for appropriate coupling with a driver circuit.

In similar fashion, the direction input at line 274 emanating from slave processor 232 is directed to the corresponding directional port, CW/$\overline{CCW}$ of a stepper motor driver integrated circuit 302 which is identical to that described at 292. The corresponding step B signal at line 276 is directed to the clock, $\overline{CLK}$, terminal of device 302 through line 304. Those inputs provide phase quadrature based outputs for phases A-D at corresponding output lines 306, 309, which, as in the case of device 292, are coupled to four pull-up resistors of array 300 to +5 v. The outputs additionally are directed to corresponding A-D motor phase connections at connector J4 for association with a driver circuit.

Turning to FIG. 9D, the control arrangement for deriving solenoid valve actuation or drive signals is illustrated. These six solenoid actuated valves have been described at three valve arrays 150 and 152, for example, in connection with FIG. 4. Four of the drive signals for the solenoids are derived directly from master processor 224 as emanating from its ports P3.0-P3.4 and presented at respective lines 312-315 which incorporate respective Schmitt inverters 318-321 and, in turn, are directed to terminals of a connector J5 for connection with corresponding solenoid actuated valves designated arbitrarily 1-4. Drive signals for the remaining two solenoid actuated valves are developed from terminals P3.4 and P3.5 of master processor 224 which are coupled via respective lines 324 and 326 to the A3 and A4 input terminals of a buffer 328. Device 328 may be provided, for example, as a type 74HC240 and serves as an inverter. The resulting inverted outputs for the solenoids designated 5 and 6 are presented at respective lines 330 and 332 to a connector J10 functioning to couple with a driver circuit.

Also coupled with connector J5 is an NPN transistor Q1, the collector of which is coupled to +5 v; the emitter of which is coupled with connector J5 to provide a EV signal and the base of which is connected to the signal designated "RST". The latter signal is generated with a lowering of the +5 v or reset. The EV output of the device is utilized as a conditioner to the solenoid valve drive logic to avoid abrupt current imposition at power up and power down. A similar NPN transistor, Q2, is identically coupled and associated with the solenoid drives 5 and 6 at connector J10.

Returning to FIG. 9C, a connector J2 is seen coupled to the signal output of the A HOME sensor and the B HOME sensor, respectively described in conjunction with opto-interrupt sensing devices 98 and 144 in FIG. 6. Additionally, the connector provides +5 v and ground for those devices, and responds to a START PRINT push button which may be employed with the apparatus 10 to generate a PRINT signal at a line 340. Generally, the A HOME sensor signal is associated with an X or transverse axis of movement of the marker head 30 and is seen directed along line 342 to the input of a Schmitt reactive opto-isolator 344. This input includes a filtering network comprised of resistor R15 and capacitor C4, and provides an A HOME, true low signal at line 346 which is seen to be coupled to one pull-up resistor within pull-up resistor array 348 via lines 350 and 352. Line 350 also may be coupled with light emitting diode (LED) (not shown) utilized for diagnostics in indicating that the home position has been reached. The home signal at line 352 is seen to extend as represented at line 356 to the P3.4 port of slave processor 230 and, additionally, as illustrated in FIG. 9A, is directed to one input of a programmable array logic component 358 (PAL). PAL 358 may be provided, for example, as a type 16LB. Returning to FIG. 9C, the B home sensor signal representing a Y axis or vertical movement home position emanating from device 144 described in conjunction with FIG. 6 is provided along line 360 to the input of another Schmitt reactive opto-isolator 362 identical to the opto-isolator 344, the input to device 362 is filtered by a network including resistor R6 and capacitor C5. The true low output of device 362 at line 364 is pulled up by one pull-up resistor of array 348. The B HOME signal further is directed via line 370 to lines 370 and 372 to the P3.4 input of slave processor 232 and as illustrated in FIG. 9A, line 370 is seen to continue to provide an input at PAL 358 which is logically ANDed with the corresponding signal at line 352 to provide a combined home signal at line 374. Line 374, in turn, is directed to one input of buffer 204 and generates a corresponding output signal at connector J1 for PC utilization at line 376.

The PC conventionally provides an initialization signal, "INIT" at the terminal J1 for the purpose of initializing a printer. That initialization feature is utilized by the instant system. In this regard, the initialization signal is presented at line 384 which, in turn, is directed to one input of PAL 358. The result is the generation of a corresponding reset signal at line 210. The reset signal at line 210 is directed to buffer 204 as earlier described to provide a buffered output reset signal at line 386 which extends through line 388 to the reset terminal of slave processor 230 as seen in FIG. 9C. Additionally, line 388 extends to the reset terminal of slave processor 232 through line 390 and, as seen in FIG. 9D, extends additionally to the reset input of master processor 224. This reset signal is treated or filtered by a capacitor C6 within a line 392 coupled, in turn, to line 388.

Referring again to FIG. 9B, a connector J8 provides for input/output communication with the user. For example, the control panel for the apparatus may include a "GO" and "ABORT" input which, may be switch activated. A GO input signal is directed from connector J8 via fused line 396 to the input of an opto-isolator 398. Device 398 may be provided, for example, as a type 70MIDC5, the +terminal input of which is coupled to an I/O common terminal at connector J8 via lines 400 and 402. The resulting output at line 404 is true low and functions to effect the energization of a light emitting diode which is coupled through limiting resistor R8 to +5 v. Line 404 is seen to extend to +5 v through a pull-up resistor of the pull-up resistor array 250 and, additionally, via line 406 to the base of an NPN transistor Q3. The collector of transistor Q3 is coupled with +5 v, while the emitter thereof is coupled through resistor R9 to ground as well as to line 408 which, looking to FIG. 9A, extends to connector J1 to provide an indication to the PC that a GO condition has been initiated.

Returning to FIG. 9B, in similar fashion, an externally derived ABORT signal by a switch or the like will be directed from connector J8 via fused line 410 to one input of an opto-isolator 412. The +input of device 412 is coupled via line 414 to line 400, and the output thereof is present at line 416. Line 416 is seen coupled the cathode of a light emitting diode D4 which is connected through limiting resistor R10 to +5 v. Line 416, as before, is directed to the base of NPN transistor Q4, the collector of which is connected with +5 v and the emitter of which is connected through resistor R11 to ground as well as via line 418 and line 420 is seen in FIG. 9A to connector J1. Line 418 further extends to an input to PAL 358 which, in turn, issues a reset signal at line 210. Thus, on the occasion of an ABORT input, the PC is alerted and the circuitry is reset. In effect, the PC is instructed to cease sending data.

The READY and DONE signals developed from the master processor 224 are, as described above, directed to the slave processor 232 as seen in FIG. 9C to provide corresponding READY and DONE signals at two line lead array 264 representing bus 266. Returning to FIG. 9B, bus 266 is seen to introduce these two signals at two line lead array 422 to the A3 and A4 input ports of a buffer 424. Buffer 424 may be provided, for example, as a type 74HC244 and provides corresponding inverted outputs at its terminals Y3 and Y4. Terminal Y3 is coupled, carrying a buffered READY signal which is logically true low, via line 426 to the input of an opto-isolator input/output device 428. Device 428 may be provided, for example, as a 70M0DC5 device and generates a corresponding DC output at fused line 430 extending to an appropriate I/O output at connector J8. The input to device 428 from line 426 also functions to energize a light emitting diode (LED) D5, which is coupled to one side thereof, the opposite side being coupled through resistor R12 to +5 v.

Returning to buffer 424, the Y4 terminal thereof provides a buffer DONE signal at line 432 to the input of an opto-input/output coupled 434. Device 434 may be identical to that at 428 and generates a corresponding DONE output signal at fused line 436 extending to connector J8 which is connectable, in turn, to the control PC. This signal at line 432 which is logically true low, also serves to cause the energization of a light emitting diode D6 which is coupled to +5 v through resistor R13.

In the event that the master processor 324 receives data from the PC that is "not understood" to which it cannot react, the program associated therewith assumes that a communication error has occurred. As a consequence, the device 224 will issue a COMM ERROR signal from its port P2.0 at line 440 which is directed to line 442 to the A4 terminal of a buffer 444. Device 444 may, for example, be a type 74HC244 and provides a resulting output at line 446 which, in turn, is directed to a connector J6, the opposite input to which is coupled through resistor R14 to +5 v and serves to connect to an LED to indicate transmission error to the operator. This communications error signal at line 442 is additionally directed via line 448 to the A1 terminal of buffer 328 which, in turn, provides a buffered communications error signal at its Y1 terminal and line 450 which is seen to extend to the gate of field effect transistor Q5 and simultaneously via line 452 to the gate of identical field effect transistor Q6. The source terminals of transistors Q5 and Q6 are each coupled to ground, while the gates of these transistors respectively are coupled to lines 404 and 416. Thus, with the application of a communications error signal from line 450, the GO and ABORT signals are simultaneously pulled low, a condition responded to by the PC as an indication that a communications error is at hand. Transistors Q5 and Q6 may be provided, for example, as type VN0300L.

Buffer 444 also is seen having an input at its A2 terminal at line 454 which carries the DONE signal otherwise generated as an output at line 436. This same signal is inverted by the buffer 444 (FIG. 9D) and provided at its Y2 output at line 456 as a signal designated, $\overline{DONE}$. That same signal is presented to connector J1 in FIG. 9A at line 458 for transmission to the supervisory PC.

The power supply is represented in FIG. 9D as a block 464. The power supply serves to provide DC outputs of +5 v, +12 v, a high voltage DC supply (HV) which will have a value of about 165 volts DC and the earlier-discussed low voltage reset signal, RST.

The controller circuit illustrated in connection with FIGS. 9A–9D performs in conjunction with a series of driver circuits functioning to provide drive to the solenoid actuated valves of the system as well as the two stepper motors. The latter, steppers motors generally are driven in phase quadrature and those phases are represented in the discourse to follow as A through D. The same circuit is utilized for energizing the solenoids of the solenoid actuated valves with a solenoid based jumpering configuration. Thus, the jumpers for this simple conversion are represented in the drawings to follow illustrating the driver circuit. However, the circuit in particular is described in connection with a stepper motor driving function. For each of the applications with motors and solenoids, a salient feature of the circuit resides in the return of inductively induced power, for example, at inductor-based device turn-off to the power supply itself. Because all of the inductive components are located within the compact housing 12, the elimination of heat from power otherwise dissipated is highly desirable.

Figure 10A:
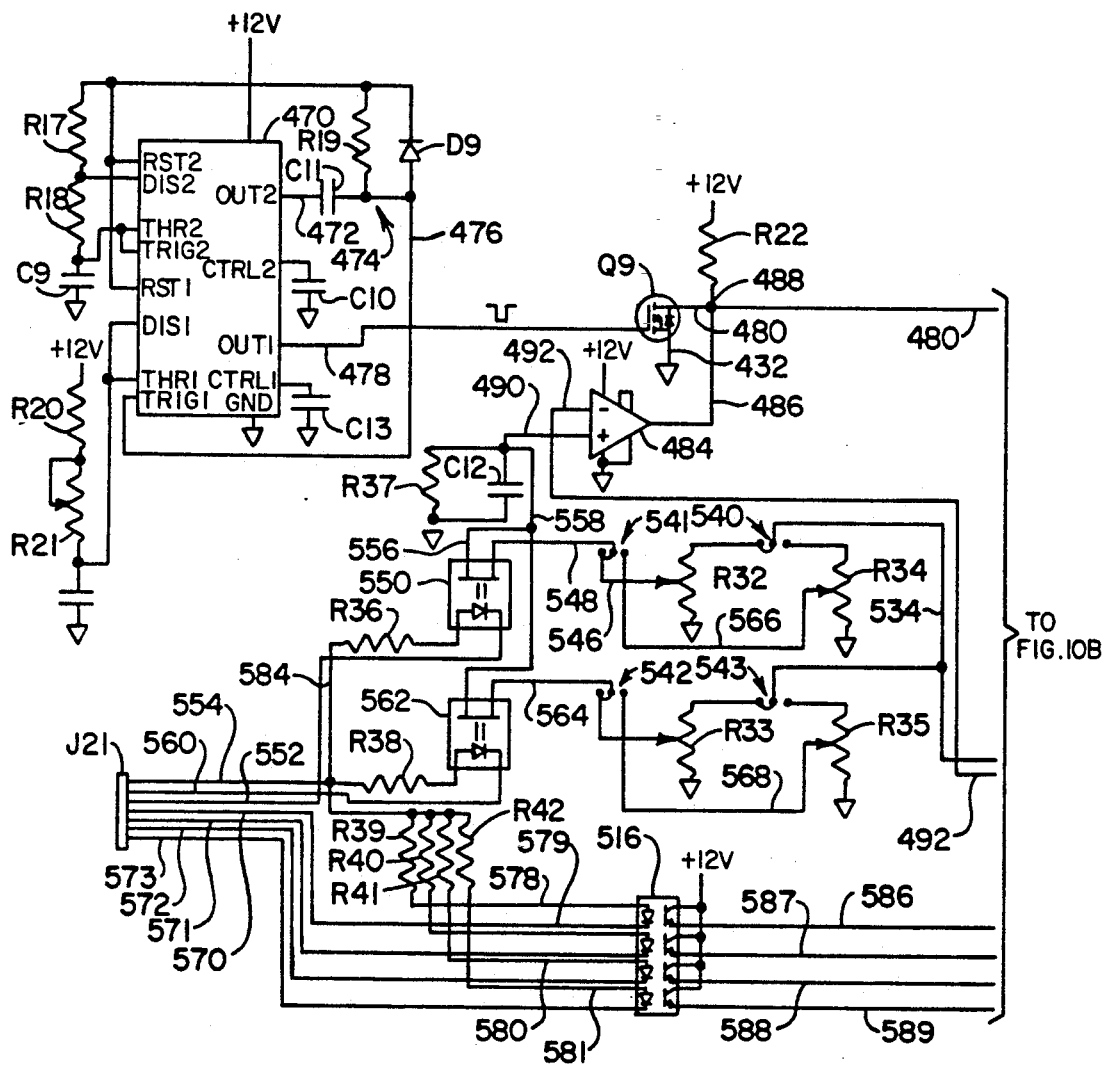
FIGS. 10A and 10B combine as labeled thereon to provide an electrical schematic diagram of a driver circuit employed with the apparatus of FIG. 1.
Figure 10B:
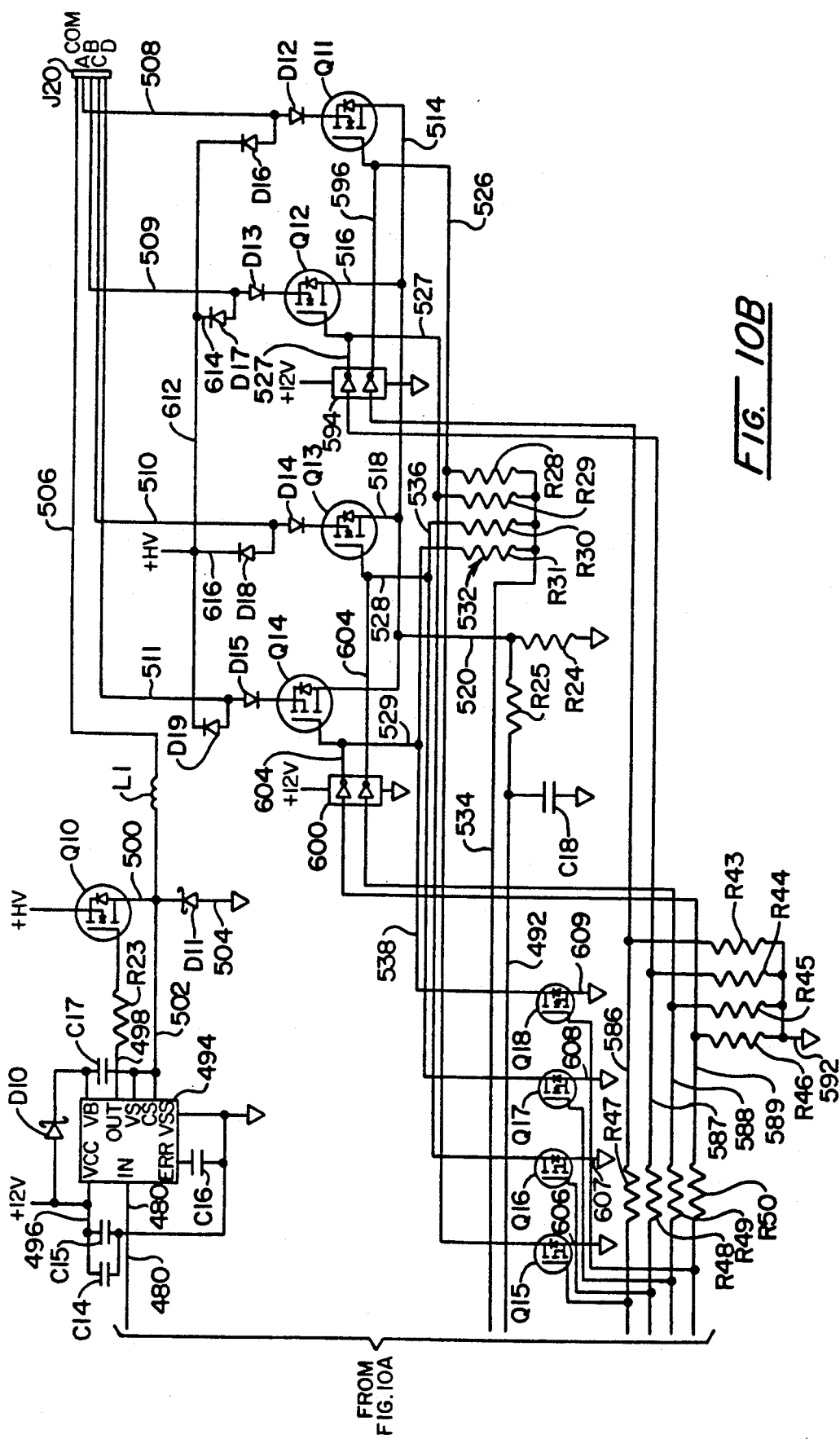

In general, the driver circuitry functions as a constant current system performing in conjunction with a pulse width modulation control achieving desired current levels. Depending upon the number of loads being driven, the circuit will alter load introduced current by a factor of that number of loads. FIGS. 10A and 10B should be considered conjointly as labeled thereon for the instant description. Looking particularly to FIG. 10A, the driver circuit is seen to develop a basic control signal through the utilization of a pulse drive circuit including a dual timer/oscillator 470. Provided, for example, as a type LM556 marketed by Signetics, Inc., the top portion of device 470, as configured with resistors R17 and R18 as well as capacitors C9 and C10, develops a 48 KHz oscillative output at line 472. This output is differentiated by a differentiating network comprised of capacitor C11 and resistor R19. A steering diode D9 within line 476 protects this output from negative excursions and line 476 is seen directed to the trigger TRIG input of the lower portion of device 470. This lower portion of device 470 is configured in conjunction with resistors R20 and R21 as well as capacitors C12 and C13 to achieve a one-shot multi-vibrator function. Variable resistor R21 adjusts the interval of the output signal and the adjustment utilizing these peripheral components serves to develop an output signal and the adjustment utilizing these peripheral components serves to develop an output at line 478 which generates a low-going signal for a predetermined interval, for example 10.5 microseconds. This predetermined interval represents the maximum pulse time or interval that current is permitted to be introduced to the inductive loads being driven by switching regulation. The 10.5 microsecond signal at 48 KHz is introduced to the gate of a field effect transistor Q9. Provided, for example, as a type VN0300L, the drain of transistor Q9 is coupled to line 480, while the source thereof is coupled via line 482 to ground. A pull-up resistor R22 is seen connecting the drain terminal at line 480 to +12 v, the device Q9 having an open drain output.

The output at line 480 is pulse width modulated by a pulse width control including a comparator 484 having an output at line 486 joined with line 480 at point 488. Comparator 484 may be provided, for example, as a type LM311N and receives a reference input signal at its positive input at line 490 and a load current responsive input at its negative input terminal at line 492.

The pulse width modulated triggering signal at line 480 is directed to the input terminal (IN) of a high side, N channel field effect transistor driver 494. Device 494 may be provided, for example, as a type IR 2125 marketed by International Rectifier, Inc. It has a VCC input at line 496 coupled with +12 v and filtered at capacitors C14–C15. The output port (OUT) of device 494 at line 498 is coupled through resistor R23 to the gate of power application switch present as an N channel field effect transistor (FET) Q10. Provided, for example, as type IRF 732, the drain of device Q10 is coupled to +HV or high voltage, for example, at 185 volts D.C. The source of the device is coupled to line 500 and line 502 which is directed to the CS and VS terminals of driver 494. Driver 494 is configured with peripheral components including a Shotkey diode D10 and capacitor C17. In operation, when transistor Q10 is in an off state, capacitor C17 is charged to the noted +12 v supply. When the input to device 494 at line 480 exhibits a high logic level, the capacitor C17 will function to discharge across the gate of FET transistor Q10 turning it on to evoke a voltage rise at the source equal with the HV voltage source, for example, at 185 volts. Ports VS and CS of device 494 ride with this value and, inasmuch as the capacitor C17 derived voltage is within the circuit, transistor Q10 remains on. The signal terminates with the removal of a logic high at the input terminal (IN) of device 494 at line 480. A Shotkey diode D11 is seen coupled with line 502 and the source terminal of transistor Q10 serving as a switch mode power rectifier accommodating an inductive current discharge necessarily returning from the inductive loads involved. Note that the diode is coupled to ground through line 504 and may be provided, for example, as a type MUR830. Line 502 is seen to extend to the input of an inductor L1, the output thereof at line 506 extending to the HV common terminal of a connector J20. The remaining couplings at connector J20 are seen to be the phase designated outputs of the driver circuit as seen at A–D to provide the individual load or phase signals and are logically true low, serving to convey the current signal at the HV connection line 506 to an appropriate motor phase. Accordingly, these phase inputs A–D are controlled from a power selection switch arrangement provided as four identical phase field effect transistors (FET) Q11–Q14. Provided, for example, as type IRF732, the drain of transistor Q11 is seen coupled to the A phase connection via line 508. The drain of transistor Q12 is coupled to the B connector via line 509; the drain of transistor Q13 is coupled to the C connection via line 510; and the drain of transistor Q14 is coupled to the D connection at connector J20 via line 511.

The source terminals of transistors Q11 and Q14 are coupled to line 514 while the corresponding source terminals of transistors Q12 and Q13 are coupled to that line 514 via respective lines 516 and 518. Line 514, in turn, is connected by line 520 to one side of a sense resistor R24, the opposite side of which is connected to ground. Line 520 also is coupled with earlier-described line 492 containing resistor R25 and is connected with capacitor C18.

With the arrangement shown, with the turning on of transistor Q10, the high voltage, for example 185 VDC induced current commences to flow through inductor L1, whereupon it traverses an appropriate component of the load as selected from phase connectors A–D. For example, where connector A has been elected from transistor Q11, current then flows across the drain-source of transistor Q11 to be witnessed from lines 514 and 520 at the sense resistor R24. Generally, the current will rise exponentially and the voltage induced at sense resistor R24 then may be witnessed by the driver system as corresponding with current value. For example, assigning a value of 1 ohm for resistor R24 will result in the generation of a 0.5 v reference value for a corresponding current of 0.5 amps, in turn, representing a desired regulated current value, this reference value is provided through resistor R25 and line 492. Capacitor C18 extends between line 492 and ground. Returning to FIG. 10A, line 492 extends to the negative input of comparator 484. Accordingly, for the exemplary 0.5 v desired reference, the device 484 will pulse width modulate the 48 KHz signal at 488.

Looking to FIG. 10B, it may be observed that the gates of transistors Q11–Q14 are coupled, respectively, with lines 526–529. Of these gate connected lines, line 526 is seen coupled to an initial resistor R28 within a summing network of resistors represented generally at 532 and having a summing output at line 534. In similar fashion, line 527 from the gate of transistor Q12 is connected to resistor R29; line 528 in combination with line 536 is coupled to resistor R30, and line 529 in combination with line 538 connects the gate of transistor Q14 to resistor R31.

Looking additionally to FIG. 10A, the summing output of the resistor network 532 at line 534 is shown directed to a series of potentiometers R32–R35, pairs of which may be elected by the user for driving a stepper motor or for driving the solenoid component of solenoid actuated valves employed with the pneumatic pin drives of apparatus 10. For stepper motor drive, potentiometers R32 and R33 are elected by appropriately connecting jumpers 540–543 as shown. Alternately, for solenoid implementation, jumpers 540–543 are coupled in the other remaining orientation. Assuming a stepper motor utilization, the desired reference level is adjusted at potentiometer R32 for the desired current applied to the phases of a stepper motor during its running condition. When the stepper motor is holding at a given position, a holding current is required of lesser extent than the running current and adjustment of potentiometer R33 provides for this alteration. In this regard, it may be observed that the wiper arm 546 of potentiometer R32 is coupled to line 548 which, in turn, is coupled to an optofet coupler 550. Device 550 may be provided, for example, as a type H11F2 and is triggered or switched by application of a logic true low run current signal from line 552. A positive voltage input is applied to the opposite input to device 550 from line 554 through limiting resistor R36. The inputs applied at connector J21 will be recognized as those provided from either connectors J3 or J4 as discussed in connection with FIG. 9C. The output of device 550 is coupled through lines 556 and 558 to line 490 extending, in turn, to the reference or positive input to comparator 484. The reference input to comparator 484 is filtered by a capacitor C19. Additionally, a resistor R37, as seen coupled to ground as well as to line 490, functions to pull the reference signal line to ground setting current to zero and avoiding a signal float condition.

In similar fashion, the application of a low true stop or hold current signal at line 560 serves to close a circuit including resistor R38 and line 554 at the input of optofet coupler 562. Device 562 is identical to coupler 550 and serves to switch the output from the wiper arm of potentiometer R33 at line 564 to line 558. Thus, a holding reference signal is applied to the positive input terminal of comparator 484 from line 490.

Thus structured, the driving arrangement utilizing the reference input to comparator 484 as varied by the voltage values from summing network 532 permits the development of higher current values with the activation of additional ones of the phase switching transistors Q11-Q14. In this regard, with the turning on or gating, for example, of a second one of those transistors, then the voltage evoked from summing network 532 will double to correspondingly increase the reference input to comparator 484. The same alteration of the reference input occurs with the utilization of transistors Q11-Q14 to drive the solenoid components of solenoid actuated valves. In the latter regard, returning to FIG. 10A, it may be observed that with the earlier-noted opposite connection of jumpers 540-543, potentiometers R34 and R35 may be employed for the purpose of adjusting reference voltage. It may be observed that the wiper arm of potentiometer R34 is coupled via line 566 to line 548 through jumper 541 to provide a drive solenoid current of higher value. Where desired, current can be adjusted from the wiper arm of potentiometer R35 which is seen coupled via line 568 to line 564.

Selection of the phase transistors Q11-Q14 for activation is made from respective input lines 570-573. These lines are selected, as before, from connectors J3 and J4 described in connection with FIG. 9C. The low true signalas at lines 570-573 are directed to corresponding cathode inputs of opto-coupler 576, the anode inputs thereto being coupled via respective lines 578-581 to resistors R39-R42 which are connected, in turn, via line 584 to a voltage source, i.e. 5 v at line 554.

Device 576 may be provided, for example, as a type PS25014 (N.E.C.) and the application of a true low input to selected lines 570-573 produces a corresponding logic low at respective output lines 586-589 seen in FIG. 10B. Lines 586-589 are pulled down to a logic low through respective resistors R43-R46 which are coupled to ground through line 592. The resultant low going drive signals are presented through respective resistors R47-R50 to the gates of respective transistors Q11-Q14. In this regard, lines 586 and 587 are directed to the inputs of MOSFET driver 594 which inverts the signal at line 586 to apply a positive gating input to transistor Q11 via lines 596 and 526 and to transistor Q12 via lines 598 and 527. Device 594 may be provided, for example, as a type DS0026.

In similar fashion, low going activating signals from lines 588 and 589 are directed to the input of MOSFET driver 600. In this regard, the input or drive signal from line 588 is converted and directed via lines 602 and 528 to the gate of transistor Q13. Similarly, the signal at line 589 is directed from device 600 via lines 604 and 529 to the gate of transistor Q14. As noted before, the values of these inputs are responded to at the resistor summing network 532 for the purpose of developing a reference input at comparator 484.

Gating output lines 586-589 also are respectively coupled to the gates of N-channel field effect transistors (FET) shown respectively at Q15-Q18. The drain terminals of transistors Q15-Q18 are coupled via respective lines 526, 527, 536, and 538 to the gate inputs of respective transistors Q11-Q14 as well as to the corresponding summing network 532 resistors R29-R31. As transistors Q11-Q14 are turned off, respective transistors Q15-Q18 are turned on to bring the inputs to the gates of transistors Q11-Q14 to ground via respective lines 608-609 coupled between ground and the source terminals thereof. This grounding action assures return to a zero volt state to enhance the accuracy of the reference voltages evolved from summing network 532.

Because of the inductive nature of the loads drives by the driver circuitry, accommodation is made to divert the inductive spike or reverse current back to the power supply. FIG. 10B shows diodes D12-D15 protecting the respective transistors Q11-Q14 from this reverse inductively induced current surge. However, oppositely oriented diodes D16-D19 are shown having their anodes coupled with respective lines 508-511 and their cathodes coupled via line 612 in the case of diodes D16 and D19, and additionally respective lines 614 and 616 for the case of diodes D17 and D18 to high voltage, i.e. HV common. As the noted inductive spike or reverse current occurs, the HV common at line 506 essentially becomes negative or reverses line 502 leading to inductor L1 which becomes negative as well, and current then flows at diode D11. Additionally, diodes D16-D19 are utilized to return the current generated by the inductors back to the power supply, a result lowering the otherwise transformed and resultant heat generation.

Figure 11:
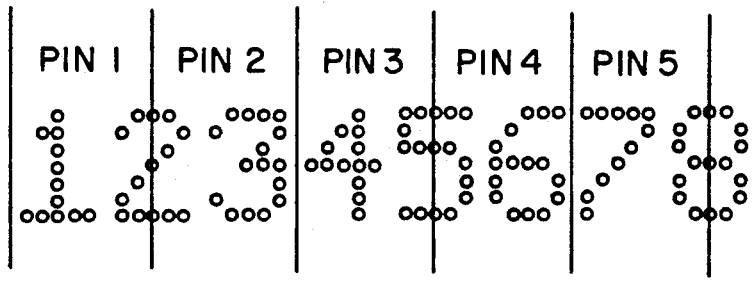
FIG. 11 illustrates a character string formed by the apparatus of the invention, showing pin operational regions.

The control features of the apparatus 10 permit each pin of the marker array 30 to form whole and portions of adjacent characters. In this regard, a first pin such as a pin 1 may form 1½ characters within its zone of activity, while the next adjacent pin or pin 2 will effectively "splice" by forming the remainder of the character formed partially by pin 1. This aspect of pin assignment is revealed in FIG. 11, the vertical lines in the figure, which in effect will be seen to be of zero width, illustrating the lateral zone of influence of each pin.

Figures 12, 13:
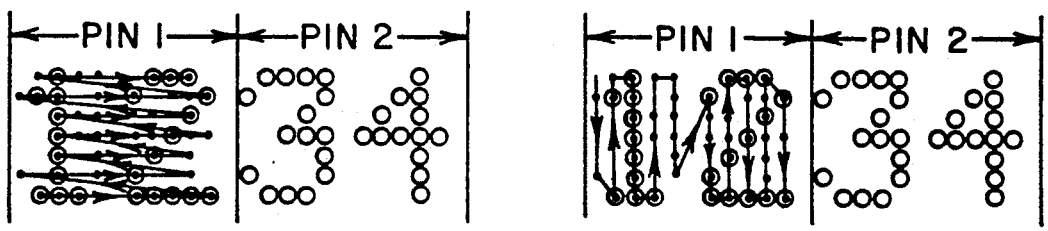
FIG. 12 is an illustration of the locus of travel of the marker head when in a raster operational mode and additionally showing stopping positions as solid dots.
FIG. 13 is an illustration of the locus of travel of the marker head when in a matrix operational mode and additionally showing stopping positions as solid dots.

The marking procedure itself may be in three modes, a "raster" mode, a "matrix" mode, and a "continuous" mode. During the raster mode, the marker head assembly 26 is moved sequentially from row to row from the bottom of the character region and the marking procedure involving the actuations of the pins of array 30 is one which takes place in one horizontal or transverse direction only. This procedure enhances the machine readability of the resultant characters, an aspect of particular value with the machine reading of OCR characters and the like formed by the pins. As marking occurs in a raster mode, the control system of the apparatus 10 looks at each successive row of a character matrix for an entire line of characters or field and determines whether active pixels are present. In the fly back portion of the raster locus of travel of the marker head 26, the head will move directly to the position of the next such active pixel at that row for any character, as opposed to returning to move between full terminal positions in character-defining matrix. Similarly, as the marker head moves in its singular "marking" direction, it will move to a location representing a active pixel within the row for any character. FIG. 12 illustrates a raster mode locus of travel for the pin array 30 for four characters of a field, 1,2, 3,4. Characters 1 and 2 are within the traversing cell of pin 1, while characters 3 and 4 are within the traversing cell of next adjacent pin 2. The locus of movement of pins 1 and 2 is shown with respect to pin 1, each stop of the marker head 26 being represented as a solid dot along the locus. Note that the stopping positions apply for all active pixels of the four characters. This technique has been found to save as much as 30% of the time required to mark a given message field. Looking to FIG. 13, a "matrix" form of locus of movement for the marker head 26 is revealed in conjunction with the same four characters 1,2,3,4, and pins 1 and 2 are illustrated in FIG. 12. In this form of movement, the marker head 26 is moved downwardly and upwardly along successive columns of the matrix. However, where no active pixels remain in the course of locus of movement along one given column for an entire field of characters, then the marker head will move to position an appropriate pin at the next active pixel of the next column for any character. As before, the constraining of the movement of the marker head 26 to define a full matrix is avoided and savings in the time required for marking a given field of characters is realized to an extent as high as about 30%.

Figure 14:
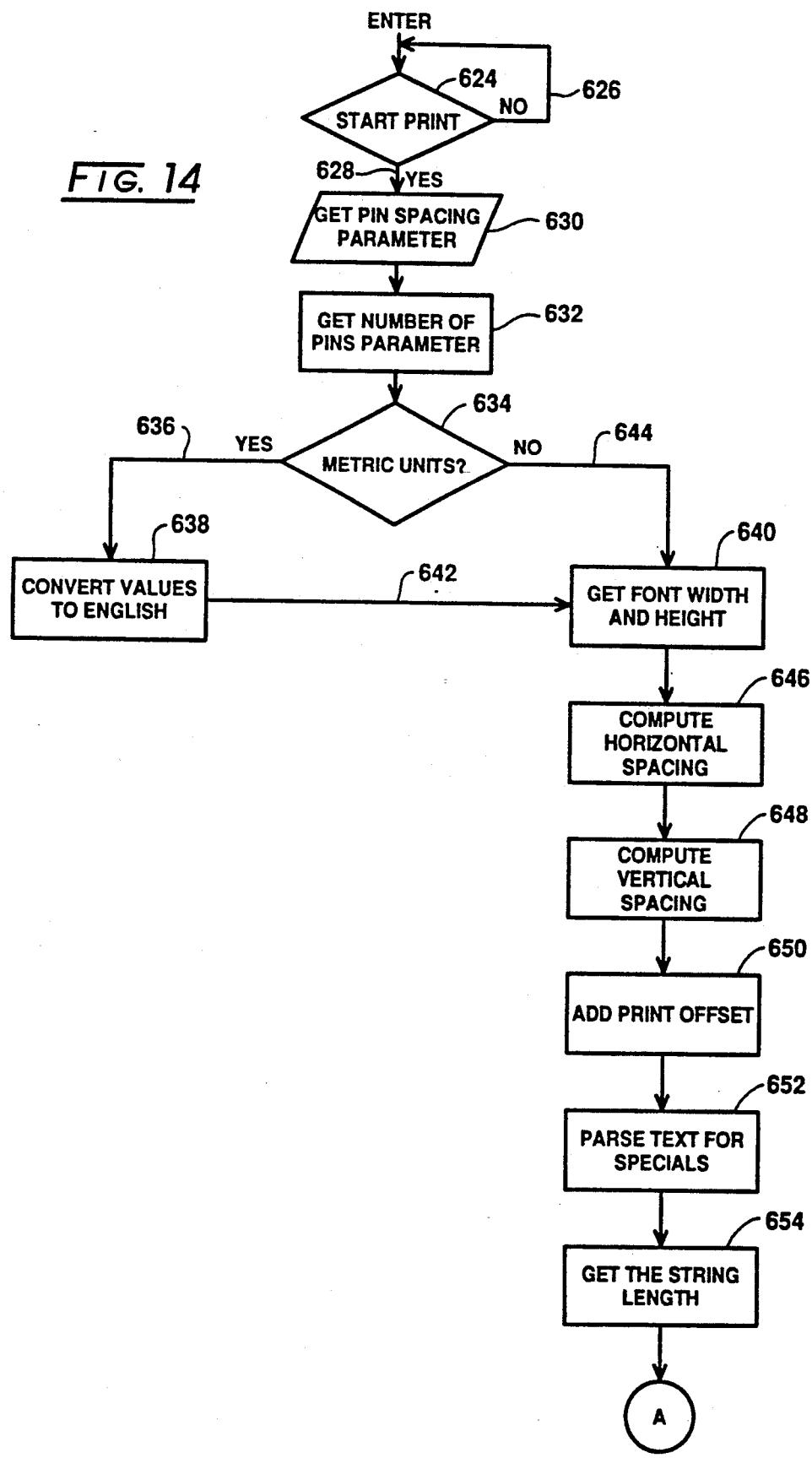
Figure 15:
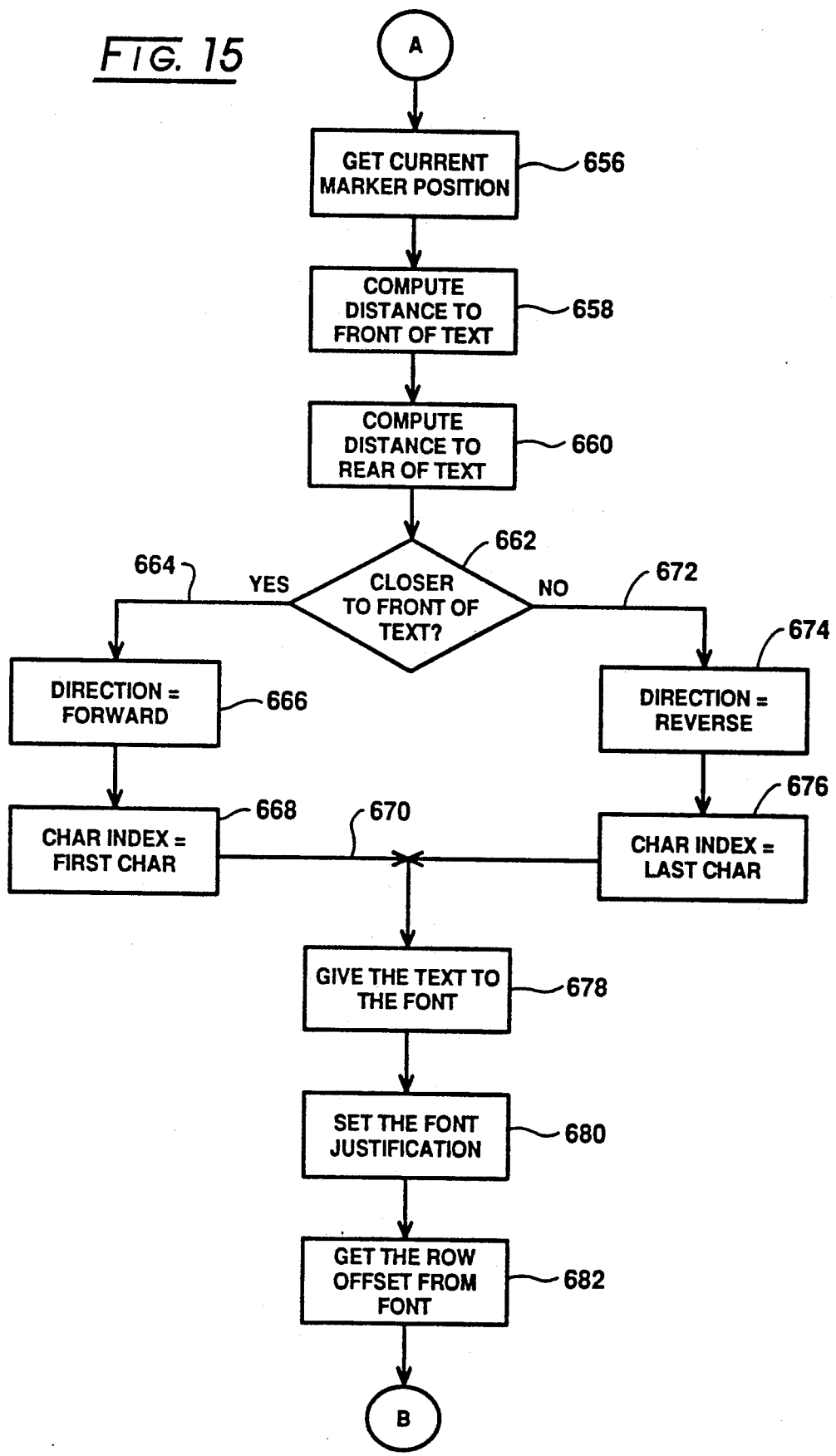

FIGS. 14-21 combine as indicated by the alphabetical identification of nodes to provide a flow chart of the control aspects of apparatus 10. Referring initially to FIG. 14, the program is seen to commence at a point in time where the user has provided desired information at a personal computer (PC), for example, entering the location of text fields, the size of such fields, the content of such texts, and marking parameters defining how fast the markers are to be moved, the number of pins within the array 30, as well as their spacing and the like. With this input to the apparatus 10, printing for a field or one string of characters commences a "START PRINT" query as represented at block 624. In the event of a negative determination, the program loops as represented by loop line 628. However, with the receipt of that command, as represented at line 628, pin spacing data is retrieved as represented at block 630. Then, as represented at block 632, the number of pins within the array 30 is acquired. Next, a determination is made as represented at block 634, as to whether English or metric units are being utilized by the user. In the event of an affirmative determination, then as represented at line 636 and block 638, the metric values at hand are converted to English units. In the latter regard, the apparatus 10 program is devised to work only with English units. The program then continues to the above noted block 640 as represented at line 642. Where metric units are not involved, then the determination at block 634 is in the negative and as represented at line 644, the program proceeds to obtain font width and height as represented at block 640. This width and height represents the number of pixels wide and high of the currently selected font for the field at hand. For example, matrices can be selected having 5×7, 5×9, 7×9, 7×11, 11×16, and secure font structuring. Next, as represented at block 646 the horizontal spacing of each pixel or dot within a font is computed based upon the user selected width and height of characters and information of block 640. Upon the computation of horizontal spacing, then as represented at block 648, the same computations are made with respect to vertical spacing between pixels. The program then proceeds as represented at block 650. The print offset is determined, a value representing the offset of the first character of the field to the left-hand edge of the marker assembly 26. This apprises the system of the location at which to start. Next, as represented at block 652, the text is parsed for special fields. In this regard, the user can provide certain control codes in the text message allowing the automatic insertion of such information as time of day, day of week, month, and the like. Additionally, there may be autoserialization fields to apply to serial numbers to progressive components in an industrial environment. Accordingly, the message provided by the user is examined for this information. String length then is computed representing the number of characters of the field as depicted at block 654. The program then continues as represented at node A which reappears in FIG. 15 leading to the instructions at block 656 providing for the acquiring of the current position of the marker assembly 26. In this regard, its position can be essentially anywhere in a marking area. Knowing the marker position, as represented at block 658, a determination is made as to the distance to the front of the text and as represented at block 660, a computation is made as to the distance to the rear of the text. Inasmuch as the device 10 can print either forwards or backwards, the appropriate proximity is determined. Then, as represented at block 662, a determination is made as to whether the marker assembly 26 is closer to the front of the text or to the rear of it. In the event it is closer to the front, then as represented at line 664 and block 666, a direction of forward is indicated and the charcter index is set at the first or leftwardmost character as represented at block 668. The program then continues as represented at line 670.

In the event the determination at block 662 is that the assembly 26 is not closer to the front of the text, as represented at line 672 and block 674, the direction for movement of the apparatus 26 is set to be that of reverse and the character index is set at the last character of the field text as represented at block 676. The program then continues as represented at earlier-noted line 670 to the instructions at block 678 providing for giving the text to the front wherein all pixels are defined for that font structuring. In this regard, the font may be a secure font having, for example, additional pixels added to certain characters in conjunction with a security algorithm. Such a security arrangement is described, for example, in U.S. Pat. No. 4,883,291 by Robertson, entitled "Dot Matrix Formed Security Fonts", issued Nov. 28, 1989 and assigned in common herewith.

Figure 16:
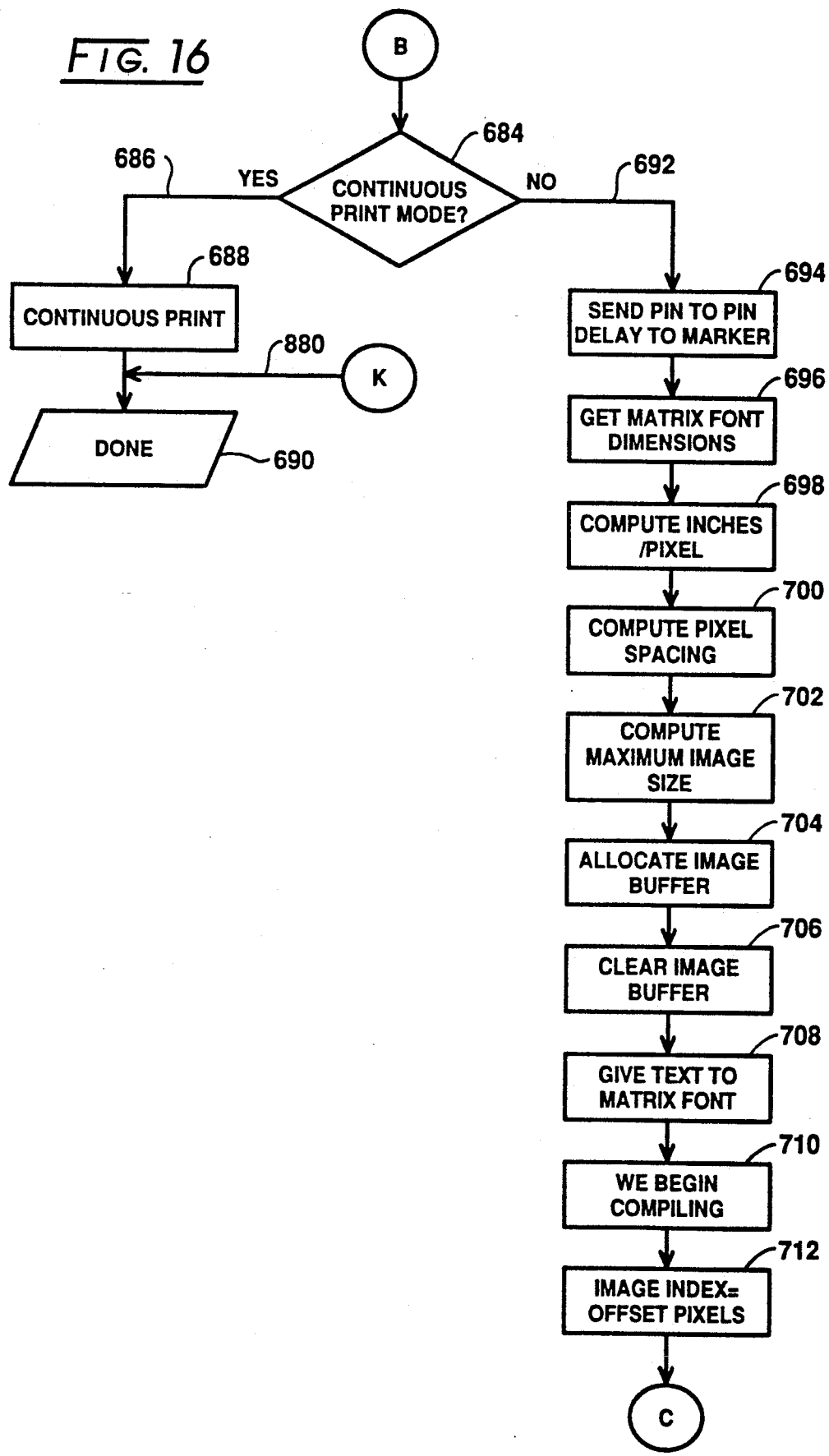

The program then proceeds to set the font justification as represented at block 680. A user can specify during the programming whether the font is to be bottom justified, center justified, or top justified. Next, as represented at block 682, the row offset from the font is obtained. The row offset is the bottom row of the font as it is used. In this regard, that row may have descenders and thus, the bottom pixel of such a descender is determined. The program then proceeds as represented at node B which reappears at FIG. 16. Referring to FIG. 16, node B is seen to lead to the inquiry at block 684 where a determination is made as to whether a continuous print mode is at hand. Such a mode, as opposed to the earlier-described matrix or raster mode, is one wherein the pins of array 30 are actuated in such a manner as to generate a continuous line without observable spacing between pixels. In the event of an affirmative determination, then as represented at line 686 and block 688, a listing of pixels for a sequence of characters is loaded and stored for continuous print. Continuous printing then is carried out as described in connection with FIGS. 22A-22H. The program at this juncture then is completed following such loading as represented at block 690.

In the event of a negative determination in conjunction with block 684, the operational node will be one of the earlier-noted matrix of raster techniques. Accordingly, as represented at line 692, a bit map representation of the field is compiled. However, as a preliminary input, as represented at block 694, a pin-to-pin delay is sent to the marker control. This delay provides for a discrete interval between the firing of successive pins. Without this insertion, it is statistically possible and, indeed probable, that two or more pins will be fired simultaneously to evoke a dynamic reaction at the marker head 26. This dynamic reaction must be overcome by either an individual whose hands are supporting the apparatus 10 or by the rigging within which it may be mounted. The interval may be very short, for example 1 to 2 milliseconds between each successive pin actuation. The result is to time average the reaction force developed with the pins striking the surface to be marked. The bit map representation then is developed as represented at block 696 with the obtaining of the matrix font dimensions of height and width. Then, as represented at block 698, the number of inches between pixels is computed. Next, as represented at block 700, pixel spacing is computed. This is the number of pixels between each character, for example between the characters "3" and "4" in FIGS. 12 and 13. Next, the maximum image size is computed, for example the size involves the number of pixel columns bearing the entire message. A block of memory is reserved of corresponding size to hold the compiled image. Accordingly, a calculation basically representing the width of each character and the number of pixels between each character, as well as the number of characters generates this capacity requirement as represented at block 702. Next, as represented at block 704, the image buffer is allocated, a block of memory being derived from memory manager which is cleared such that it indicates no active pixels. This clearing procedure is represented at block 706. The text then is given to the matrix font similar to the procedure at block 678 and shown in the instant figure at block 708. Pixel images then are, in effect, laid out in memory or compiling is commenced as represented at block 710 and, as represented at block 712, the image index is set to the offset pixels, i.e. the offset computed, for example, with respect to the left-hand edge of the marker assembly.

Figure 17:
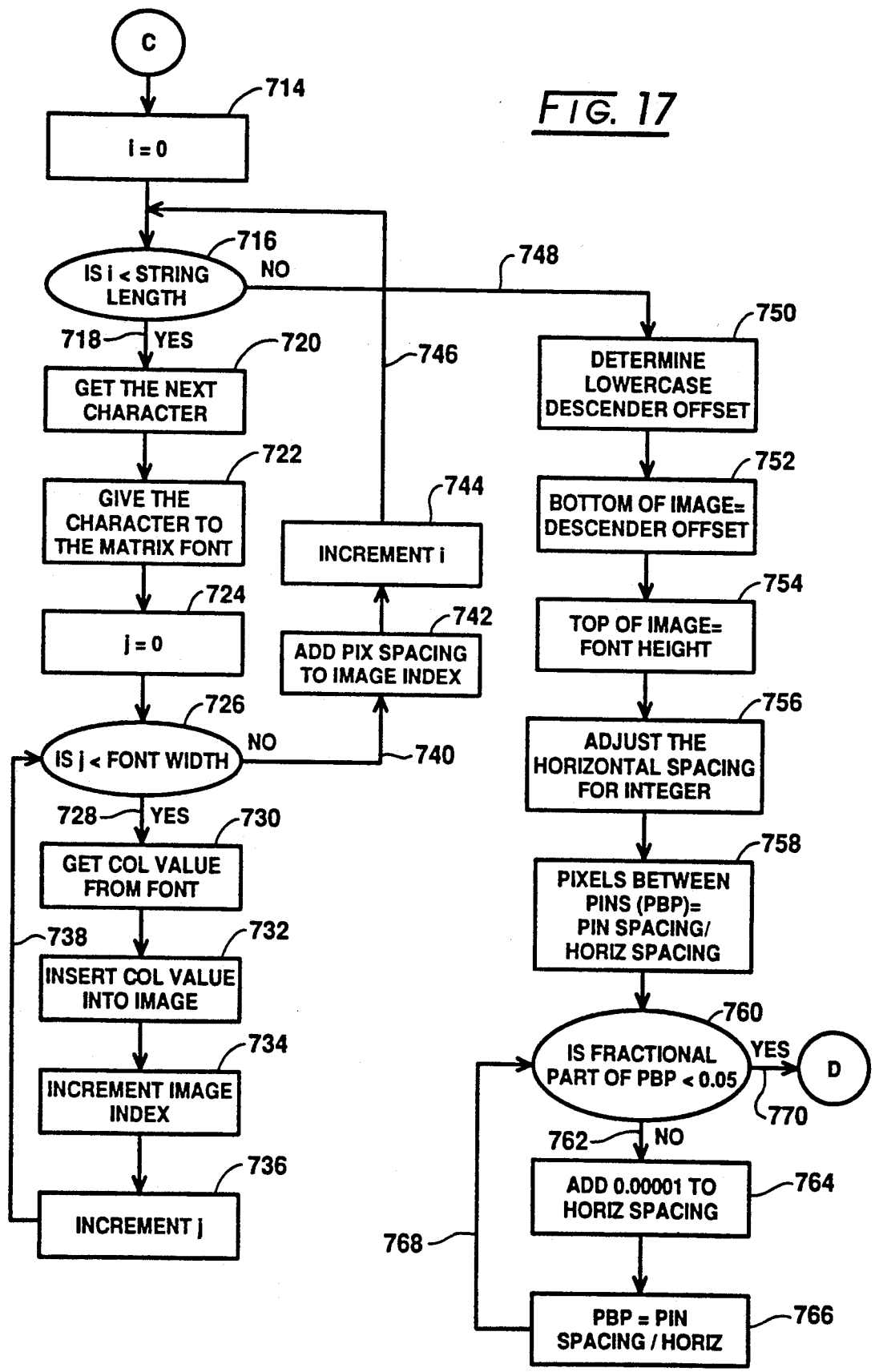

The program then continues as represented at node C which is reproduced in FIG. 17 leading to the instructions at block 714. These instructions provide for initializing a counter, i, to zero. The program then enters a looping activity in conjunction with the determination at a loop designator 716 identifying whether the index value, i, is less than the string length. This index i represents the number of characters in the present string. Where that number is less than the number of characters of the string length, then as represented at line 718 and block 720, the next character is acquired and, as represented at block 722, the character is given to the matrix font and, as represented at block 724, an index, j, representing the column designation for each character is set to zero. The program then considers a next loop designator 726 determining whether the index, j, is less than the font width or the number of columns for the character at hand. Where that is the case, then as represented at line 728 and block 730, the binary value for that column is acquired from the font and, as represented at block 732, the column value is inserted into the image buffer. Next, as represented at block 734, the image index or the buffer is incremented and, as represented at block 736, the index, j, is incremented and the looping procedure continues as represented by line 738 extending to designator 726.

Where the determination at designator 726 is that the index, j, is not less than the font width, then as represented at line 740 and block 742, the pixel spacing is added to the image index, it being recalled that the pixel spacing is the distance between two adjacent characters as determined in terms of pixels. Then, as represented at block 744, the index, i, is incremented and as represented at loop line 746, the program returns to the inquiry at loop designator 716. Where the index, i, is not less than the string length, then as represented at line 748 and block 750, a determination is made as to whether any lowercase character descender offset is present. The bottom of the image is going to be developed in conjunction with the amount of that offset. Then, as represented at block 752, as noted, the bottom of the image is set as the descender offset position. The top of the image is then set and that develops font height as represented at block 754. Next, as represented at block 756, the horizontal spacing between pixels is adjusted to become an integer value. In order to properly carry out a "splice" between each adjacent pin of the array 30, such an adjustment is required to show continuity of font structure for any given character formed by two pins. It should be recalled that the system, using multiple pins, is creating a message that can be of any width, character height or pitch. The horizontal spacing of the number of pixels between adjacent pins should be an integer value. Accordingly, as represented at block 758, a ratio defined as pixels between pins (PBP) is set equal to the pixel spacing divided by the horizontal spacing between pins. If the fractional part of that ratio value PBP is not less than, for example, 0.05 or 5%, then as represented at loop designator 760 and line 762, the value 0.00001 is added to horizontal spacing as represented at block 764. Then, the PBP value is determined again as the pin spacing divided by horizontal pixel spacing as represented at block 766. That value again is tested as represented at line 768 at designator 760. Where the determination at designator 760 shows that the fractional part of PBP is less than 0.05, then the program proceeds as represented at line 770 and node D. Experience with the instant "splicing" technique has determined that for more desirable results, the PBP ratio should be 0.01, representing a 1% pixel error.

Figure 18:
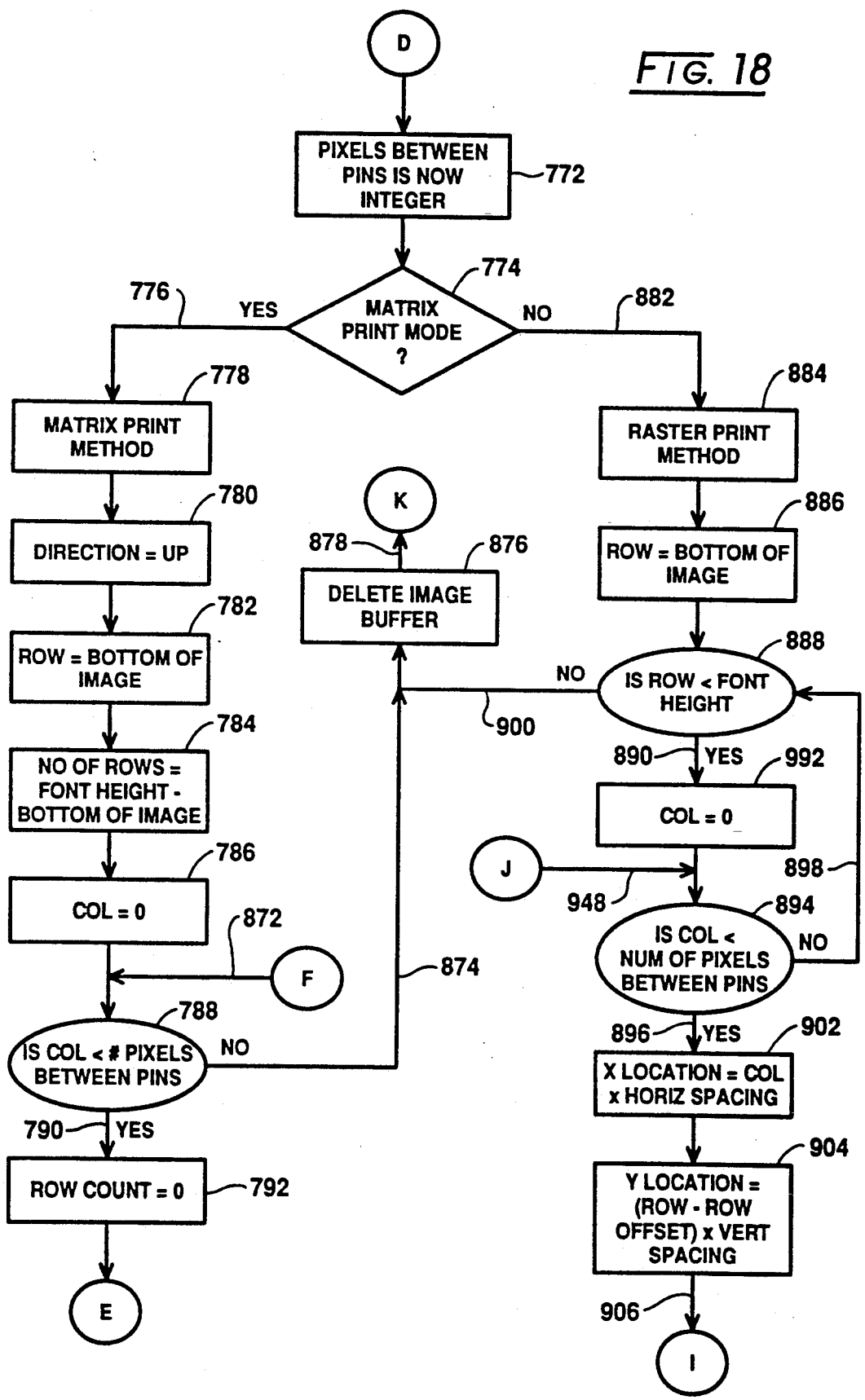

Referring to FIG. 18, node D reappears in conjunction with block 772, representing a condition wherein the pixel between pins value (PBP) is an integer. The program then proceeds to the inquiry at block 774 determining whether a matrix print mode is present. This is the print mode represented and described in connection with FIG. 13. In the event of an affirmative determination with respect to the inquiry at block 774, then as represented at line 776 and block 778, the matrix print method is undertaken and the direction for movement of the marker assembly 26 is set UP as depicted at block 780. Then, as represented at block 782, the row is set at the bottom of the image which will be the bottom of the upper case characters or the bottom of a lower case character if any of them are configured having descenders. As represented at block 784, then the number of rows to be considered by the program is equal to the font height less the position of the bottom of the image. The column count then is set to zero as represented at block 786 and a determination is made at loop designator 788 as to whether the column at hand is less than the number of pixels between pins. In the event that it is, then as represented at line 790 and block 792, the row count is set equal to zero in preparation for executing another pixel defined column. The program then continues as represented at node E which reappears in FIG. 19 in conjunction with the loop designator 794.

Figure 19:
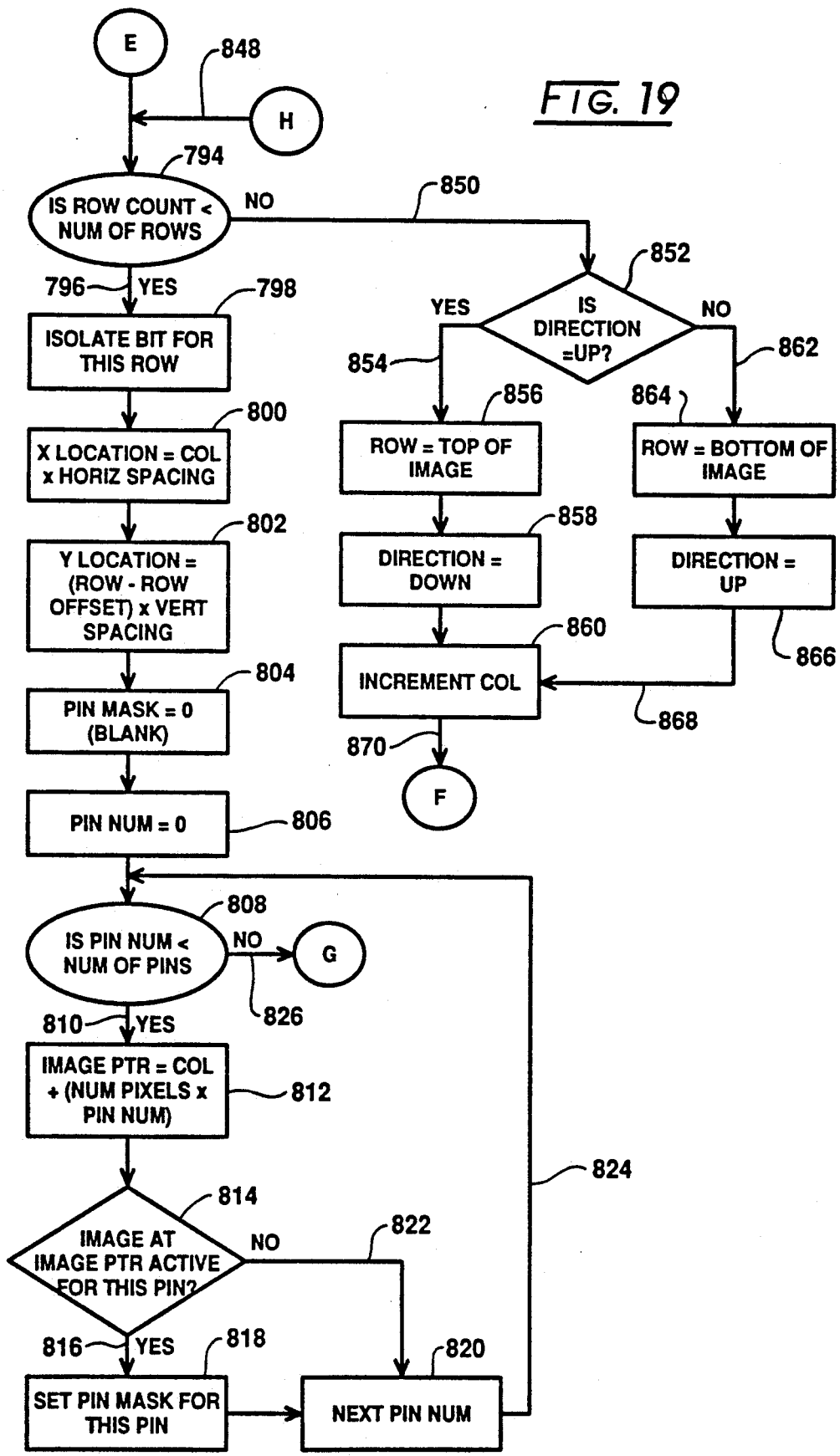

Referring to FIG. 19, at designator 794, a determination is made as to whether the row count is less than the number of rows. With an affirmative determination, then evaluation of this column is still underway and, as represented at line 796 and block 798, the bit for this row is isolated, i.e. the program is retaining awareness of the bit present and under printing consideration at this row. It is now isolated for the purpose of creating a mask for that bit. Next, as represented at block 800, the X location is determined as the column number times the horizontal spacing. This gives the X or transverse coordinate for pin positioning. Then, as represented at block 802, the corresponding Y location or vertical location that the marker must move to is set equal to the current row less the row offset times the vertical spacing. It now is necessary to determine all pins which are required to fire at this particular marker assembly 26 location. Thus, as represented at block 804, the pin mask is set to zero, i.e. it is blanked out. Then, as represented at block 806, a pin number account is set to zero and the program will then cycle for all possible pins for this location. Accordingly, as represented at designator 808, a determination is made as to whether the pin number is less than the number of pins. Where that is the case, then as represented at line 810 and block 812, a determination is made as to where in the image the array 30 is. Accordingly, an image pointer is set equal to the column number present plus the number of pixels times the pixel number that locate the pin under consideration. Each of the pins of the array 30 is at some location within the image. This calculation determines where in the image each pin is and as the image is scanned, the program looks for each of the possibly active pins and the inquiry as at block 814 is made determining is the image at that location in memory where the pin is now active or not. If it is active in the mask, then as represented at line 816 and block 818, the pin mask is set for this particular pin. The program then continues to the next pin number as represented at block 820. This next pin number is considered where the determination at block 814 is that an active image is not present at the location under consideration as represented at line 822. With advancement to the next pin number, as represented at line 824, the program loops until it has checked all pins of the array 30, for example six pins. A mask will be provided for all six corresponding bits with those bits set for the pins that have active or firing locations.

Where the determination at designator 808 is that the pin number is not less than the number of pins, then the program proceeds as represented at line 826 and node G. Referring to FIG. 20, node G reappears with the inquiry at block 828 determining whether any bit is active in the mask, i.e. is the pin mask active. It has been determined that about 30% of locations are not active for any of the entire array 30 of six marker pins, i.e. nothing requires printing. At that condition wherein no printing is required for all six pins, then as represented at line 830, nothing is active; the assembly 26 is not moved to that location, and a determination is made that the program is to go to a next block in memory to determine if active pin locations are at that next position. That next block will be up if the current direction is up. Accordingly, as represented at block 832, a determination is made as to whether the direction of movement currently at hand is up. If it is, then as represented at line 834 and block 836, the row is incremented. Conversely, where the direction is not up, i.e. it is down, then as represented at line 838 and block 840, the row indication is decremented. Then, as represented at line 842 emanating from both blocks 836 and 840, and as represented at block 844, the row count is incremented and the program proceeds to node H as represented at line 846. Node H reappears in FIG. 19.

Where the determination at block 828 is in the affirmative, then as represented at line 831 and block 833, instruction is provided to drive the assembly 26 to an appropriate print location. Then, as represented at block 835, the appropriate print pixels or active pixels for that location are printed. The program then continues as represented at lines 837 and 380 to the earlier-discussed inquiry at block 832. As before, the routine then progresses to node H which reappears in FIG. 19 with line 848.

Returning to FIG. 19, where the determination at designator 794 is that the row count is not less than the number of rows, then the matrix pattern will be at the bottom or top of a maneuver. Accordingly, as represented at line 850 and block 852, a determination is made as to whether the then current direction is upward. Where that is true, then as represented at line 854 and block 856, the row which is then present is at the top of the image. Accordingly, as represented at block 858, the direction for movement of assembly 26 is then downwardly. Additionally, as represented at block 860, the column position is incremented.

Where the determination at block 852 is in the negative, then as represented at line 862 and block 864, the row at hand is at the bottom of the image and, as represented at block 866, the direction for movement of the marker assembly 26 then is upward. The program then continues as represented at line 868 which is directed to the column incrementation instruction at block 860, thence, as represented at line 870 to node F.

Referring again to FIG. 18, node F reappears in conjunction with line 872 leading to the designator 788 questioning whether the column at hand is less than the number of pixels between pins or has the marker component 26 now moved to its furthest lateral or transverse extent. With an affirmative answer, the matrix locus pattern thus far discussed again is repeated until such time as the terminal position or final active pixel positioning has been accomplished. Where the determination at designator 788 is in the negative, then printing is complete and as represented at line 874 and block 876, the image buffer, now fully used, is deleted and the program continues as represented at line 878 and node K. Referring momentarily to FIG. 16, node K reappears in conjunction with line 880 leading to a completion or "DONE" indicator 690.

Returning to FIG. 18, where a matrix print mode is not at hand as determined at block 774, then, as represented at line 882 and block 884, a raster print method or mode is discussed in connection with FIG. 12 as at hand. It may be recalled that with this technique the marker head 26 prints in one transverse direction only following which it will "fly back" to a starting or active pixel position and recommence transverse or X-axis movement. In this mode, printing occurs from the bottom of the image upwardly and thus, as represented at block 886, the row is set as being at the bottom of the image. The program then continues to the determinator 888 where a query is made as to whether the row number is less than the font height. If it is less, then the printing activity has not been completed, upward movement still being called for. Accordingly, with an affirmative determination, then as represented at line 890 and block 892, the column number is set to zero and, as represented at designator 894, a determination is made as to whether the column is less than the number of pixels between pins. With an affirmative determination, then all columns which can be traversed have been so traversed and the program continues as represented at 896. With a negative determination at designator 894, then as represented at loop line 898, the program returns to the inquiry at designator 888 and continues. Where the determination at designator 888 is in the negative, in that the row number is not less than the font height, then printing is completed and, as represented at line 900, the image buffer is deleted as represented at block 876 and the program continues as represented at line 880 in FIG. 16 to assume a DONE state.

Returning to FIG. 18, where the determination at designator 894 is that not all columns have been traversed, then, as represented at line 896 and block 902, the X location is set to be the column number times the horizontal spacing. Similarly, as represented at block 904, the "y" or vertical location is set as the row then at hand minus the row offset times vertical spacing. The program then continues as represented at line 906 and node I.

Referring to FIG. 21, node I reappears in conjunction with line 908 leading to block 910 providing for the blanking of the pin mask. Then, as represented at block 912, the pin number is set to zero and, as represented at loop designator 914, a determination is made as to whether the pin number at hand is less than the number of pins. Where that is true, then as represented at line 916 and block 918, an image pointer is provided for the current pin. In this regard, the image pointer is the column number plus the number of pixels times the pin number. Next, a determination is made as to whether the image at that pin pointer is active or not, as represented at block 920. Where the image at the image pointer is active for this bit, then as represented at line 922 and block 924, that bit in the pin mask is ORed in. The program then proceeds as represented at line 926 to the next pin and bit as represented at block 928. Where the determination at block 920 is in the negative and the pin position is not active, then as represented at line 930 and block 928, the program looks to the next pin and bit and loops as represented at loop line 932 to the inquiry at designator 914. Upon completion, a pin mask is developed which shows which pins will be active at this X,Y location of the character string or field.

Returning to designator 914, where the pin number is not less than the number of pins, then all pins have been considered for the pin mask and, as represented at line 934 and block 936, a determination is made as to whether the pin mask is active. In the event that it is, then the marker is moved to the active location as represented at line 938 and block 940. Then, as represented at block 942, the pixels are printed for that position and the program returns to node J as represented at line 944. Similarly, where the pin mask is not active as determined at block 936, then as represented at lines 946 and 944, the program returns as represented at node J. In effect, if the mask is not active, nothing occurs and motion is thus conserved to save printing time.

Node J reappears in FIG. 18 in connection with line 948 leading to the designator determination as to whether the column at hand is less than the number of pixels between pins. Accordingly, the program will now look to the next column and check it for active pixel positions. As represented by the continuation of the program from FIG. 18 the procedure is continued until all columns between pins have been checked for active pixels and a further check is made to determine if all rows are completed. It may be observed that in the instant raster mode of operation, there is no notion of direction of the program. By contrast, in the matrix mode, the program has been required to remain aware of the direction as to whether it is up or down. In the raster mode, where the X location of the pixel is calculated, that automatically causes a retrace.

Returning to FIG. 16, where a continuous print mode is at hand as represented at block 688, the print time saving factors are not at hand, discrete and individually identifiable pixels not being printed. However, it has been found advantageous to assign printing duty to one pin in the array 30 at a time such that each pin completes the printing of characters within its cell of influence as determined by the initial set-up parameters as to font structuring and the like. Following the completion of all printing within that cell of influence, then the marker assembly 26 is returned to a HOME or starting terminal position and the next pin or at least another pin then carries out the same activity to the exclusion of all other pins.

As described in conjunction with block 688 of FIG. 16, the present system is capable of carrying out a continuous printing mode of operation. Following the loading of a listing of pixels for a sequence of characters in this mode, the program for the system enters a procedure as described in conjunction with the flow charts represented at FIG. 22A-22H. Looking to FIG. 22A, the continuous print mode is commenced at node 100, whereupon, as represented at block 1002, instructions are provided to send a zero millisecond pin-to-pin delay to the marker. It may be recalled that a slight pin-to-pin delay is provided in conjunction with the formation of pixel matrix characters to avoid the dynamics associated with simultaneously striking pins. This instruction, in effect, negates that delay. Then, as represented at block 1004, the pin mask is set to 1 to isolate the first pin. The program starts with a first pin and runs through the message being printed as many times as there are successively used pins, only printing a pixel belonging or assigned to that pin with which the program is working. Thus, with this instruction, the first pin is isolated and the pin identification is shifted with each iteration, i.e. as the full window of performance for that pin is completed. Then, as represented at block 1006, the pin count is initialized at zero. The program then carries through a loop 1 node as represented at symbol 1008 and addresses the inquiry at block 1010. At this position, the inquiry is made as to whether the pin count is less than the number of pins installed and this query is logically ANDed with the question as to whether the program has been aborted. The program progresses through the message or text being printed once for each pin installed, printing only those pixels which are within reach of the "current pin". When a next adjacent pin is switched to, the program starts that next pin with the character position left from before. Accordingly, the program continues as long as the pin count is less than the number of pins installed. Where a negative determination is made with respect to block 1010, then as represented at line 1012 and the "END" labeled node, the program diverts to its end point. With an affirmative determination at block 1010, then as represented at line 1014 and block 1016, the next pin flag is set to "FALSE". The next pin flag indicates, when "TRUE", that pixels for the next pin have been found and that the program should switch pins when the current character as worked on by the current pin are completed. In effect, where the program encounters pixels that belong to the next pin, a splicing situation is at hand such that when the instant character is finished with respect to the capability of the current pin, then it is necessary to progress to the next pin of the array. The present instruction provides, in effect, an initialization of the next pin flag to FALSE.

The program then proceeds as represented at block 1018 to provide that an index counter, i, is set to zero. This counter is used to count the number of characters which have been printed for the current pass of the marker. The program then proceeds through loop node 1020 and thence to the inquiry posed at block 1022. At this inquiry, a determination is made that the program will continue with this pass and the currently employed pin if it has not reached the end of the string being printed and an abort signal has not been received, and the program has not encountered pixels assigned to the next pin. In the event of a negative determination, then as represented at line 1025 and node L, the program will be seen to progress towards its end point. In the event of an affirmative determination, then as represented at line 1024 and block 1026, the FONT is accessed by giving the current character at the character index to it. The FONT, in turn, feeds the row/column coordinate pairs identifying the first pixel to be printed. These coordinate pairs appear in the order they were trained, i.e. the locus of movement of character definition. The program then proceeds as represented at block 1028 which, as noted above, provides for obtaining the coordinate pair in row and column from the font. Then, as represented at block 1030, a determination is made as to whether there is a coordinate pair along with a logical ANDing determination as to whether or not an ABORT condition is at hand. Where the program has completed all of the coordinates for a given character, the FONT evokes a NULL. Thus, the present inquiry tests as to whether a coordinate pair was obtained from the font, as well as a test is provided for determining the presence or absence of an ABORT condition. This ABORT condition is tested periodically to ensure that the system stops immediately upon the occasion of such an ABORT condition. In the event of a negative determination, then the program progresses as represented at line 1032 and node M which reappears toward the end of the program listing.

Where an affirmative determination has been made with respect to the inquiry at block 1030, then as represented at line 1034 and block 1036, the starting row position and the start column position are determined. This will be the coordinate row position less the row offset and the coordinate column position. The program starts at this position. Then, as represented at block 1038, the next coordinate pair are obtained from the font. Under the continuous print mode of operation, pixels are filled in between the "base" trained font pixels. Accordingly, a first coordinate pair is obtained and then the next coordinate pair are obtained, whereupon the program fills in between them to define a continuous locus.

Figure 22A:
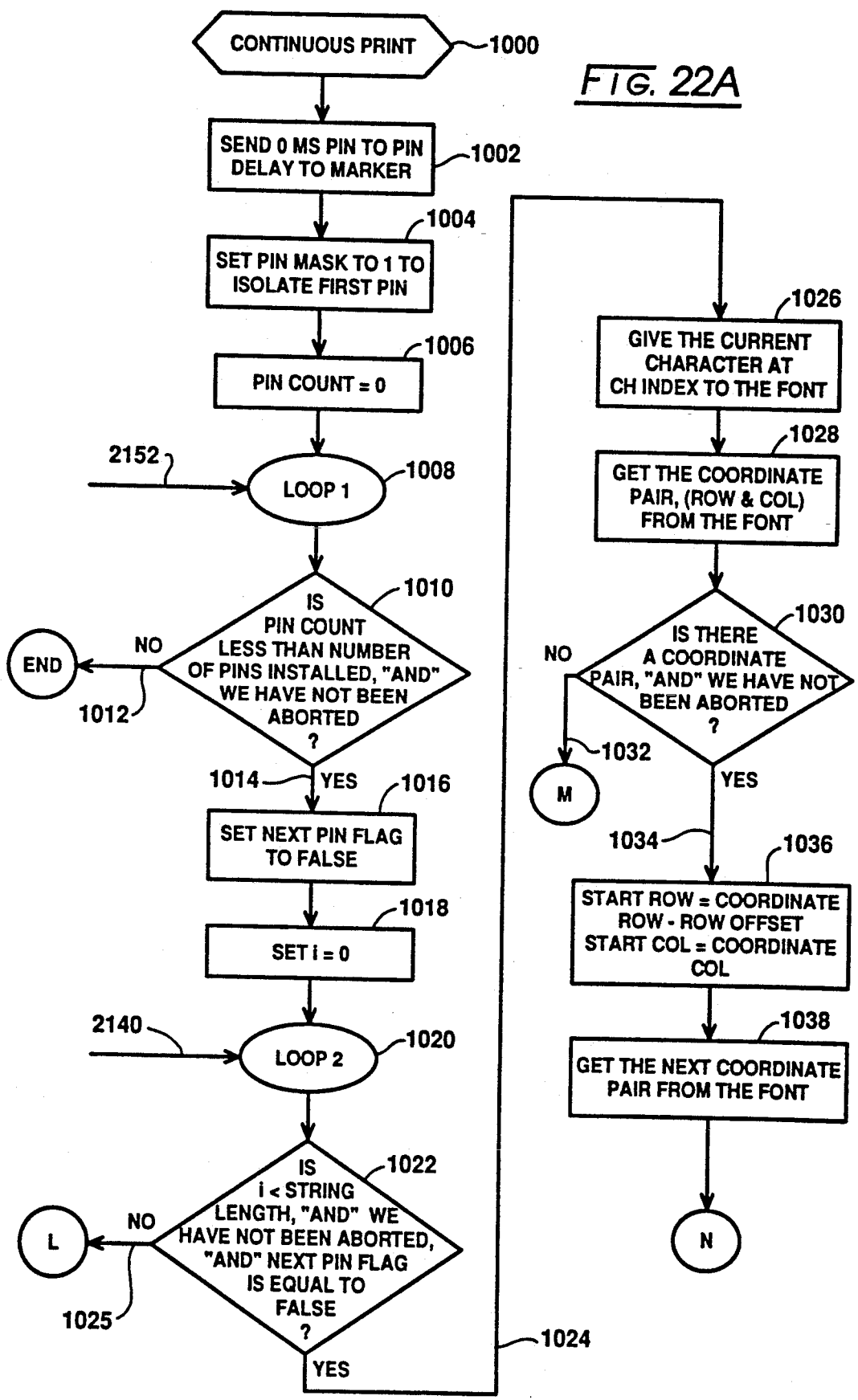
Figure 22B:
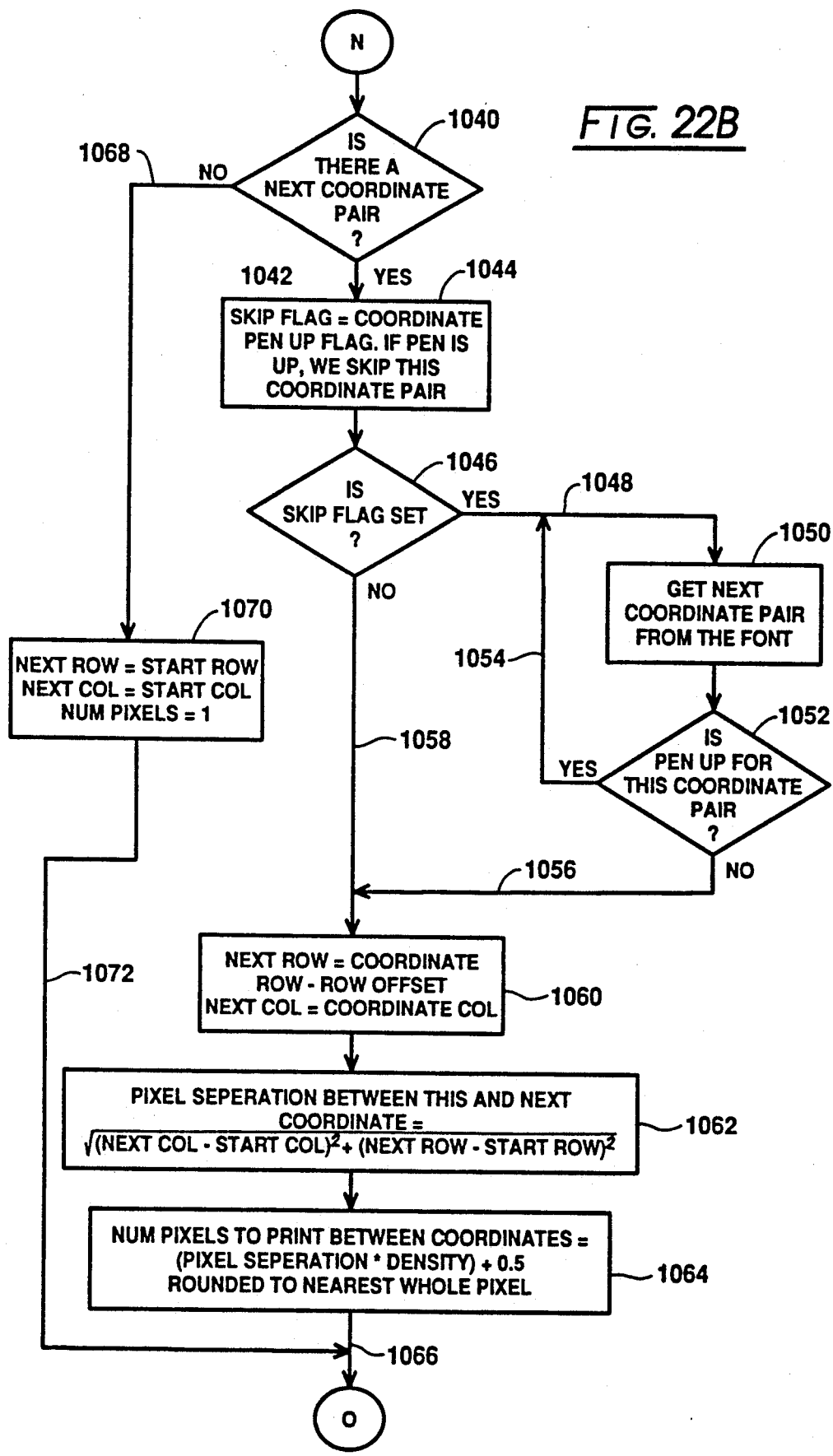

The program then proceeds as represented by node N to the inquiry at block 1040 shown in FIG. 22B wherein a determination is made as to whether a next coordinate pair is present. Where an affirmative determination is made with respect to the inquiry at block 1040, then as represented at line 1042, the program proceeds to instructions at block 1044. In general, the program provides for a continuous filling in of indentations between adjacent pixels. Normally, this will mean that the direction from one pixel to a next adjacent one will be at 0°, 90°, or 45°. However, certain characters require a locus between pixels which are not adjacent and are not at these matrix related positions. Should only matrix related positions be filled in between, then a jagged appearance would appear in lines not connecting along the noted 45° or orthogonal directions. The font may be "trained" in the font generator, certain pixels being trained with what is referred to as a "pen-up" flag. With this approach, the program allows the font trainer to "skip" pixels. Normally, the program does not connect pixels which are separated by more than one row/column relationship. Accordingly, block 1044 provides for setting a skip flag as equal to a pen-up flag. If the pen is up, then this particular coordinate pair is skipped, the skip flag being set. The program then looks to the inquiry at block 1046 wherein a determination is made as to whether the skip flag is set. In the event that it is, then as represented at line 1048 and block 1050, the next coordinate pair is acquired from the font. The program then inquires as represented at block 1052 as to whether a pen-up condition is present for this coordinate pair. In the event that it is, then, as represented at lines 1054 and 1048, the program loops again to the instructions at block 1050 providing for the acquisition of a next coordinate pair from the font. In the event that the inquiry at block 1052 or at block 1046 is in the negative, then, as represented at lines 1056 and 1058, the program proceeds to the instructions at block 1060. The instructions at block 1060 provide for locating the row/column coordinates for the next column and row as adjusted for the row offset. This row offset, as noted above, accommodates for lower case descenders. The program then proceeds as represented at block 1062 to carry out an exercise of the Pythagorean theorum. In this regard, the position of the start column is subtracted from the end point or next column and that value is squared. Additionally, the position of the START row is subtracted from the next row value or end row value and that value is squared. The square root of the sum of those values then is taken and assigned as the pixel separation between the present and the next coordinate. Then, as represented at block 1064, that separation is multiplied by a pixel density in pixels per inch to provide for the number of "fill in" pixels between coordinates. The pixel density generally is user specified and, the value 0.5 is added to truncate the value to a whole number of pixels. The program then proceeds as represented at 1066 and node O associated therewith.

Where the inquiry at block 1040 results in a negative determination, then there is no next pixel and the coordinate pair is the last for this character. Accordingly, as represented at line 1068 and block 1070, the next pixel is set as the one currently under consideration, only one pixel being printed or formed wherein the marking for that location is completed. As seen at block 1070, the next row is set to the START row and the next column is set to the START column, the number of pixels being set at 1. The program then continues as represented at line 1072 to the node O at line 1066.

Figure 22C:
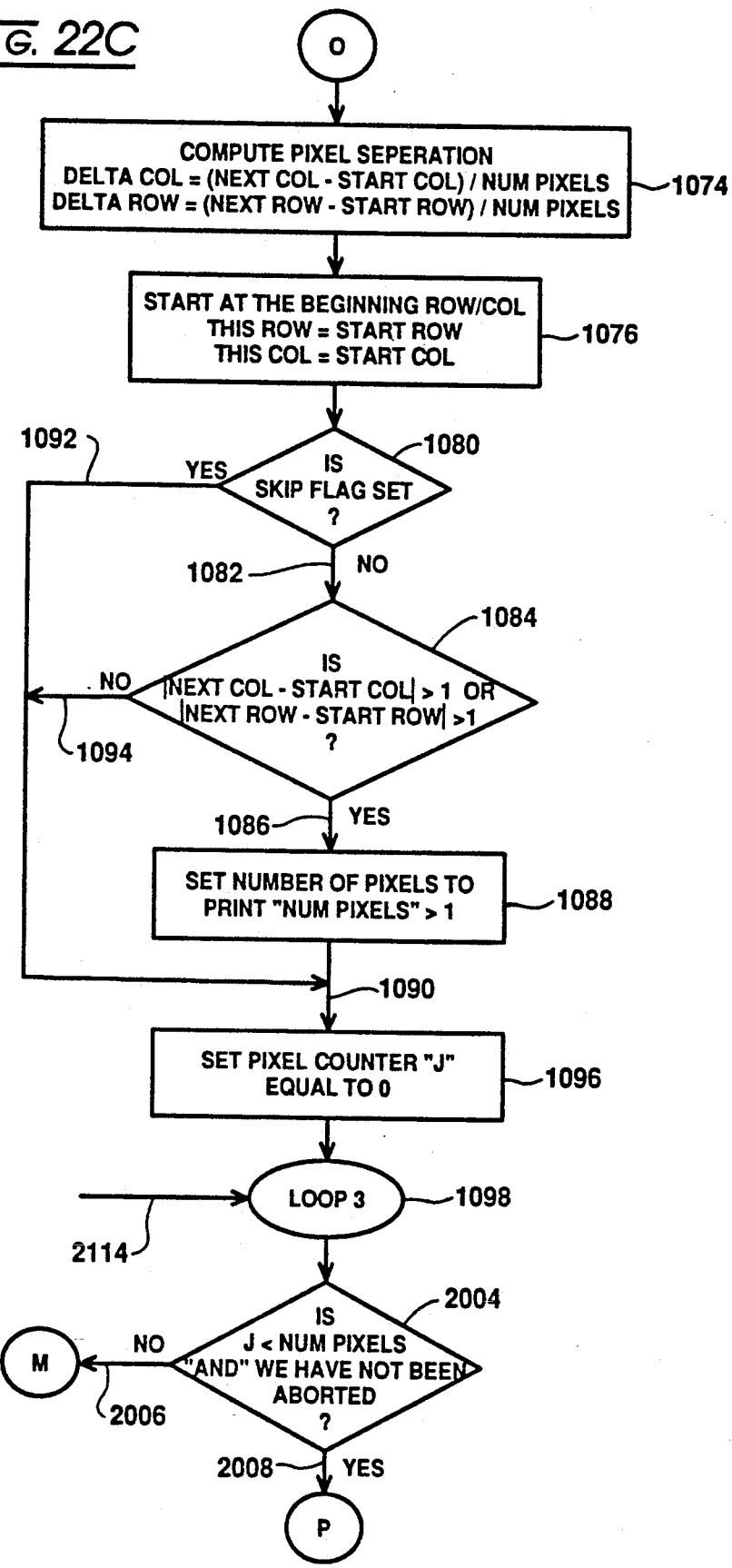
Figure 22D:
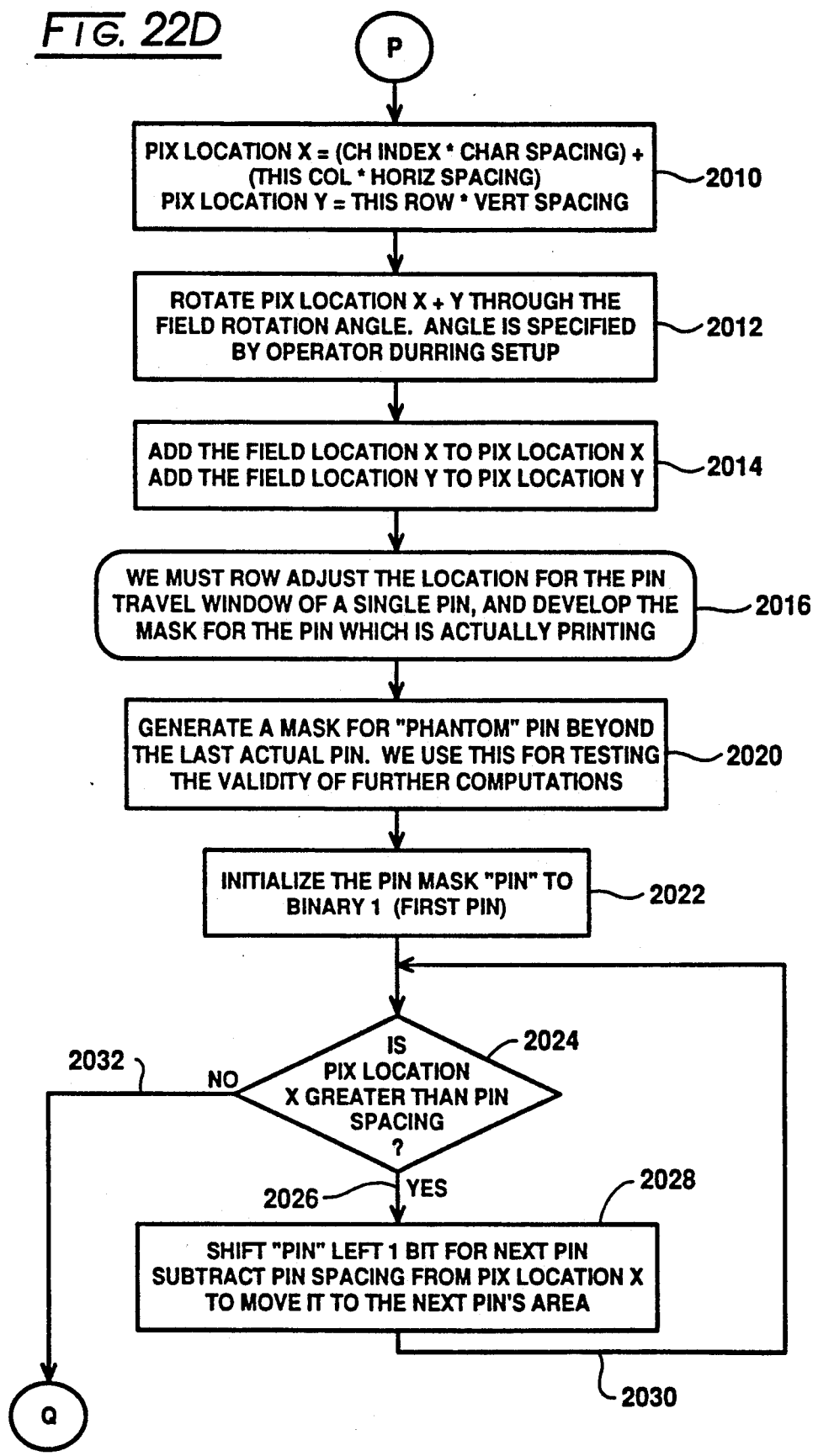

Referring to FIG. 22C, node O appears as represented at block 1074, a determination is made as to the fractional change in row and column positioning required for each of the "fill in" pixels. The number of fill in pixels between two end points is known at this juncture. The forthcoming fill in pixel will be more than likely at some angle and it is necessary to determine how much space in row and column terms is required for movement. Generally, the movement will represent the hypotenuse of a small triangle. Accordingly, the instructions at block 1074 provide for the computation of pixel separation, a delta column being developed as the difference between the next column position and the START column divided by the number of pixels and the delta row value being the next row less the starting row value divided by the number of pixels. Then, as represented at block 1076, the current or this row is set to the start row and this current column position is set as the start column.

The program then progresses to the inquiry at block 1080 wherein a determination is made as to whether a skip flag is set. Under a continuous mode of performance, the program only will fill in between two adjacent pixels of a given character matrix. Accordingly, as represented at line 1082, where the skip flag is not set, a test is carried out to assure that the pixel being printed to is not further away than one pixel spacing in either a row or column direction. The tests corresponding therewith as set forth at block 1084 compare the absolute value of the difference between the next column position and the start column position with respect to 1 and similarly, determines whether the absolute value of the next row position less the row start position is greater than the value of 1. In the event of an affirmative determination, then as represented at line 1086 and block 1088, the number of pixels to print is set to 1 and the program proceeds as represented at line 1090. Where the inquiry at block 1080 is in the affirmative and/or the inquiry at block 1084 is in the negative, then as represented at lines 1092 and 1094, the program diverts to line 1090 which is seen to be directed to the instructions at block 1096. At the latter block, the program sets a variable, J to zero. This variable, J, is used to count the number of pixels that will ultimately amount to the number computed as described above.

The program then proceeds as represented by loop 3 symbol 1098 to the inquiry at block 2004. That inquiry determines whether the pixel counter, J, value is greater than the number of pixels required to be printed. The inquiry also is logically ANDed with a determination as to whether an ABORT condition is at hand. In the event of a negative determination, then the program continues as represented at line 2006 and node M. With an affirmative determination to the inquiry at block 2004, then as represented at line 2008 the program progresses to node P. Node P reappears in FIG. 22D. Referring to that figure, from node P the program considers the instructions at block 2010. At block 2010, the x pixel location or column related spacing and the y pixel location or row related location of the marker for the current pixel are determined. In this regard, the program commences with the character being worked on, i.e. a determination is made as to where the character commences and to that is added column and row spacing. This provides data as to the actual x and y coordinates relative to the start of the message, as opposed to the marker reference itself. The latter computation or determination is made later in the program. Note that the instructions at block 2010 call for the determination of a pixel location x as being equal to the character index multiplied by character spacing plus the current column position multiplied by horizontal spacing. Similarly, the pixel location coordinate y is determined as the current row multiplied by the vertical spacing of pixels.

Practitioners normally consider text as being printed on a left-to-right basis in a perfectly horizontal frame. The present marker system has the ability to rotate that horizontal orientation through any desired angle. For example, where the rotation is 90°, then the printing becomes vertical. Where the rotation is to the extent of 180°, then printing becomes upside down. A conventional mathematics function is used for this purpose. Block 2012 provides for the rotation of pixel locations x and y through a field rotation angle which is specified by the operator or user at the time of set-up of the system. The program then commences to the instructions at block 2014. At this juncture, the program pixel location is relative to the start of the field of character string. Now an adjustment is made to make that location an absolute marker coordinate. This is carried out by adding the field location for x and y to the respective pixel locations for x and y.

The program then continues as described in conjunction with descriptive block 2016 which highlights the program activities to follow. The x, y location of the marker head is now determined and it is necessary to determine which of the marker pins is responsible for printing pixels within that x, y location.

Looking to block 2020, instructions are provided for generating a mask for a "phantom" pin. It is known how many pins there are in the cartridge at the time of set-up. It is important to determine that the system is not attempting to print a pixel which is beyond the reach of all pins of the cartridge. Thus, a mask is developed that's represented as a bit in a position beyond the last physical pin. Thus, the term "phantom" pin. This is a location where a pin would be if there were one more additional pin within the array thereof. The mask will be seen to be used at a later point in the program with respect to the last pin to print. The program then proceeds to the instructions at block 2022 wherein the pin mask designated "PIN" is initialized to a binary 1 representing a first pin. The mask will be shifted as required. The program then looks to the inquiry posed at block 2024 wherein a determination is made as to whether the pixel location, x, is greater than the pin spacing. It should be recalled that pin spacing is pin-to-pin spacing. In the event of an affirmative determination, then as represented at block 2028, the "PIN" mask is shifted left one bit for a next pin. The program substracts that pin spacing from the pixel location x to move it into the next pin's area, i.e., the program adjusts the pixel x location so that it is within reach of a single pin and functions to determine which pin that is. This component of the program loops as represented by line 2030 extending from block 2028 to the inquiry at block 2024. Where a negative determination with respect to the query posed at that block is made, then the program continues as represented at line 2032 and node Q.

Referring to FIG. 22E, node Q reappears directing attention to the commentary provided at block 2034. Block 2034 describes a procedure which follows. The actual x coordinate or directional travel of the carriage or platform typically has a travel or range of movement which is greater than the pin-to-pin spacing. For example, that travel may be 0.75 inch, while the pin spacing may be 0.5 inch. This permits an expansion of the range of marking or marking window of the last pin to the extent of the platform travel. Accordingly, referring to block 2036, an inquiry is posed as to whether the required "PIN" is the phantom pin as determined above which is located in theory beyond the last pin. This test, in effect, determines whether or not the last located pin is the phantom pin. However, the test opens an inquiry as to whether the last pin itself will be able to reach beyond a normal window of printing, for example, $\frac{1}{2}$ inch pin-to-pin spacing, due to the larger travel of the platform or carriage. i.e. $\frac{3}{4}$ inch. In the event of an affirmative determination to that inquiry, then as represented at line 2038 and block 2040, a determination is made as to whether that pin location along the x axis is less than "MAX_x" less the pin spacing. The term "MAX_x" represents the maximum x axis travel range for the carriage or platform carrying the marker pin array. For the example above, where the pin-to-pin spacing is 0.5 inch and the maximum travel or "MAX_x" is 0.75 inch, then this test determines whether the required pin location is within that 0.25 inch leeway for the last pin. In effect, all other pins of the array can print only within the pin-to-pin spacing or the pin spacing window. However, this requirement does not hold for the last pin, the window of printing for which can be expanded depending upon the above test. Where that test results in an affirmative determination, then as represented at line 2042 and block 2044, the last real pin is activated by shifting the PIN mask one bit to the right. Then, as represented at block 2046, the pin spacing is added to the pin location, x. The program then continues as represented by line 2048. Where either of the tests posed at block 2036 or block 2040 result in a negative determination, then as represented at lines 2050 and 2052, the program advances to line 2048 and the inquiry at block 2060. The inquiry posed at block 2060 determines whether the PIN mask is equal to or greater than beyond the last pin. In other words, is the pixel under consideration for printing beyond the operational capability of the last pin of the pin array. In the event of an affirmative determination, then as represented at line 2062 and block 2064, an out of reach flag is set and, the program continues as represented at line 2066 leading to line 2068 and node R. It may be observed that line 2068 extends to node R from block 2060 as representing a negative determination to the query posed thereat.

Referring to FIG. 22F, node R reappears indicating that the program then continues as represented at block 2080 to determine whether or not the required "PIN" is out of reach, this inquiry being based upon the above determination. In the event that it is not, then, as represented at line 2082 and block 2084, a test is made as to whether the required PIN is equal to the pin mask which is active on the current pass. It may be recalled from the discussion concerning block 1004 in FIG. 22A that the pin mask was initially set to a 1. That indicates which pin is elected for printing on the current pass through the message. Such a pass is carried out with respect to each pin in the program. In effect, the test at block 2084 inquires whether the pin that is supposed to print the instant pixel is the pin which is now active. In the event of a negative determination, then as represented at line 2086 and block 2088, a determination is made as to whether the program has encountered a pixel that belongs to or should be printed by a next pin of the array. Thus, an inquiry is made as to whether the next pin flag is set as true. If that is not the case, then the program continues as represented at line 2090 and block 2092. The instructions at block 2092 address the condition wherein a determination has been made that a pixel has been encountered which is properly printed by the next pin in the pin array. In effect, there are some pixels in the instant character that are going to have to be printed by that next pin. Thus, the next pin flag is made TRUE and on the next pass through the message or character string, the next pin will start with the instant character. Thus, the character index START is made equal to the character index. The program continues as represented at line 2094.

Returning to block 2084, in the event the test posed thereat is true, then as represented at line 2096 and block 2098, the pixel is printed and the program continues as represented at line 2100 to line 2094. Similarly, with a true result to the test posed at block 2088, the same logic path is followed as represented at lines 2110 and 2100.

Line 2094 to which the latter lines extend, leads to the instructions at block 2112 which provide for the location of the next fill-in pixel. In this regard, the column at hand is identified as this column plus a delta column increment and the next row is developed as the current row plus a delta row value. The program then continues as represented at line 2114 to the Loop 3 symbol earlier described at 1098. It further may be observed that with an affirmative determination at block 2080, indicating that the required "PIN" is out of reach, then as represented at line 2118, the instant position at line 2114 and Loop 3 designator 1098 is followed in the program path. Line 2114 is seen addressing the Loop 3 designator 1098 in FIG. 22C leading to the query posed at block 2004.

Figure 22G:
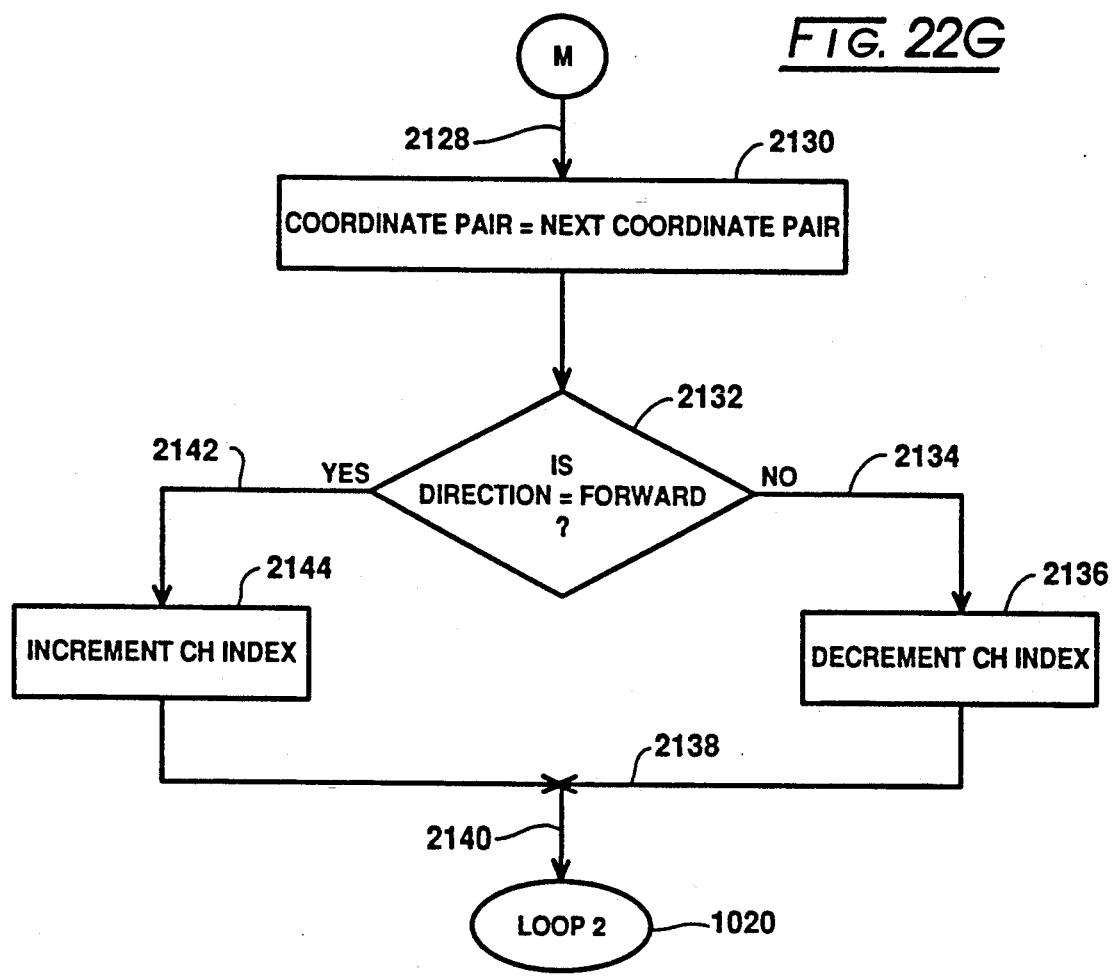

Returning momentarily to block 2004 at FIG. 22C, it may be recalled that the index, J, was utilized to count the number of "fill-in" pixels as they were printed. Where the inquiry at block 2004 indicates that the value, J, is not less than the number of pixels or in the event of an abort condition, then the program reverted to node M. Referring to FIG. 22g, node M reappears in conjunction with line 2128 leading to block 2130. Under the conditions of the test at block 2004, the program has printed between the current coordinate and the next one. The program now looks to that next one and makes that the current coordinate. Accordingly, as seen at block 2130, the coordinate pair is set equal to the next coordinate pair and the program continues to the test at block 2132. That test determines whether the direction is forward. In this regard, the direction can be forward or reverse and it is necessary to know whether the character index is to be incremented or decremented. Thus, in the presence of a negative response to the test, then as represented at line 2134 and block 2136, the character index is decremented and the program continues as represented at lines 2138 and 2140 to the Loop 2 entry symbol 1020 as seen in FIG. 22A. In FIG. 22A, line 2140 reappears being directed to Loop 2 symbol 1020. Where the test posed at block 2132 results in an affirmative determination, then as represented at line 2142 and block 2144, the character index is incremented and the program reverts as represented by lines 2138 and 2140 to the noted Loop 2 designator 1020.

Figure 22H:
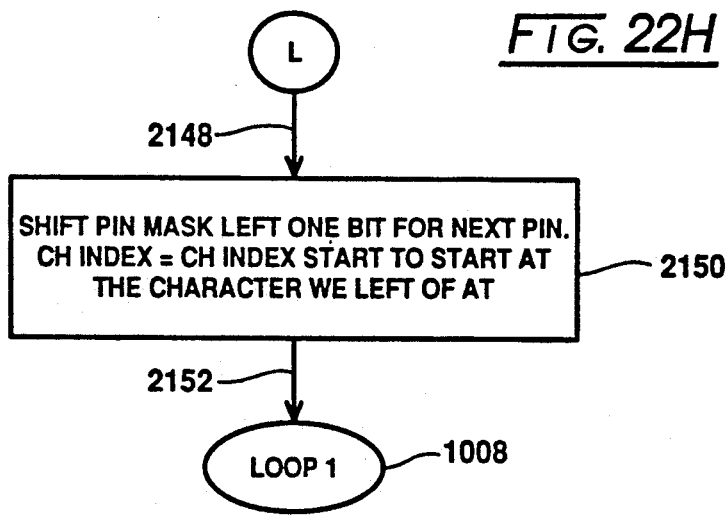

Returning momentarily to block 1022 in FIG. 22A, a determination is made as to whether the character counting index counter, i, is less than string length. In the event that it was not, then, the program reverted to node L. Referring to FIG. 22H, node L reappears in conjunction with line 2148 leading to the instructions at block 2150. For the present condition, the program has considered the full string or has encountered pixels which are to be marked by a next pin. Therefore, the program starts with that next pin. Block 2150 provides for shifting the pin mask left one bit for that next pin and the character index is set for the location wherein pixels have been designated for the next pin activity. This instruction has been treated in connection with block 2092. Thus, the message or text string is restarted at the character left off at, i.e. that character which has pixels requiring marking by two adjacent pins. This is a time conserving action avoiding the need for considering an entire message, particularly with respect to pixels already printed. The program then continues to the Loop 1 designator 1008 as depicted by line 2152. Line 2152 reappears in conjunction with the Loop 1 designator 1008 in FIG. 22A.

Since certain changes may be made in the above-described system and apparatus without departing from the scope of the invention herein involved, it is intended that all matter contained in the description thereof or shown in the accompanying drawings shall be interpreted as illustrative and not in a limiting sense.

We claim:

1. Apparatus for marking objects at a surface thereof with a sequence of characters formed by indentation, in response to data inputs, comprising:

a housing having forward and rearward portions;

a translation mechanism mounted at said forward housing portion, including a carrier assembly slidably movable only in a transverse direction in response to a transverse drive input, a transverse screw assembly fixedly mounted upon and supported for rotation by said housing forward portion and rotatable in response to a rotational transverse drive input to provide said carrier assembly transverse drive input, a coupler component mounted to and supported by said housing forward portion for slidable movement only in a vertical direction in response to a vertical drive input, a vertical screw assembly fixedly mounted upon and supported for rotation by said housing forward portion and rotatable in response to a rotational vertical drive input to provide said coupler component vertical drive input, and a carriage component connected with said coupler component for driven movement in said vertical direction while being slidably movable thereon in said transverse direction and connected with said carrier assembly for movement in said transverse direction while being slidably movable thereon in said vertical direction;

a marker head assembly connectable with said carriage component, having a confronting portion positionable in spaced adjacency with said surface and including at least two marker pins, each having an impacting tip drivably movable into said surface in response to pneumatic control inputs;

a first motor mounted within and fixed to said housing rearward portion and responsive to a first control input to provide a transverse drive output of rotational extent corresponding with said first control input;

a first transmission assembly connected in driven relationship with said transverse drive output to derive said rotational transverse drive input for effecting the transverse directional movement of said carriage component;

a second motor mounted within and fixed to said housing rearward portion and responsive to a second control input to provide a vertical drive output of rotational extent corresponding with said second control input;

second transmission assembly connected in driven relationship with said vertical drive output to derive said rotational vertical drive input for effecting the vertical directional movement of said carriage component; and control means responsive to said data inputs for deriving said first control input, said second control input and for effecting generation of said pneumatic control inputs to effect derivation of said characters at said surface.

2. The apparatus of claim 1 in which said marker head assembly includes:

electrically actuated valve means mounted within said housing rearward portion forwardly of said first and second motors, having an input connectable with a source of gas under pressure, having valve output ports and actuable in response to said pneumatic control inputs to convey said gas from select said valve output ports; and flexible conduit means coupled in gas transfer relationship between said valve output ports and a unique one of each said marker pins for effecting said movement of said impacting tip thereof.

3. The apparatus of claim 2 in which:

said translation mechanism carriage component is configured as a manifold having chambers extending from pneumatic impact ports at a first surface thereof to pneumatic output ports at a second surface;

said flexible conduit means is coupled with said pneumatic output ports; and said marker head assembly is connectable with said carriage component surface to effect said gas transfer relationship through said pneumatic output ports.

4. The apparatus of claim 1 in which:

said transverse screw assembly includes a transverse screw shaft fixedly mounted upon said housing and drivably rotatable in response to said rotational transverse drive input and a transverse drive nut mounted in driven relationship thereon and connected in drive relationship with said carrier component, said transverse screw assembly effecting said transverse direction of movement of said carrier component in response to rotation of said transverse screw shaft.

5. The apparatus of claim 4 in which said transverse screw shaft is a high helix angle lead screw having a pitch selected to drivably move said transverse drive nut about one-half inch of travel per shaft revolution.

6. The apparatus of claim 4 in which said first transmission assembly comprises:

a first transverse pulley coupled in drive relationship with said transverse screw shaft;

a second transverse pulley coupled in driven relationship with said first motor transverse drive output; and a transverse drive belt mounted in driven relationship upon said second transverse pulley and in drive relationship with said transverse first pulley.

7. The apparatus of claim 1 in which:

said vertical screw assembly includes a vertical screw shaft fixedly mounted upon said housing and drivably rotatable in response to said rotational vertical drive input and a vertical drive nut mounted in driven relationship thereon and connected in drive relationship with said coupler component, said vertical screw assembly effecting said vertical direction of movement of said coupler component in response to rotation of said vertical screw shaft.

8. The apparatus of claim 7 in which said vertical screw shaft is a high helix angle lead screw having a pitch selected to drivably move said vertical drive nut about one-half inch of travel per shaft revolution.

9. The apparatus of claim 7 in which said second transmission assembly comprises:

a first vertical pulley coupled in drive relationship with said vertical screw shaft;

a second vertical pulley coupled in driven relationship with said second motor vertical drive output; and a vertical drive belt mounted in driven relationship upon said second vertical pulley and in drive relationship with said first vertical pulley.

10. The apparatus of claim 1 in which said first and second motors are stepper motors.

11. Apparatus for marking a surface in response to data inputs with a sequence of mutually adjacent pixel characters formed within a matrix of rows and columns of dimension selected by a user, said columns being mutually spaced to define an initial, selected transverse pixel-to-pixel spacing, said apparatus comprising:

a housing;

a translation mechanism mounted upon said housing having a positioning component movable in vertical and transverse directions in response to a drive input;

a marker head assembly connectable with said positioning component, having a confronting portion positionable in adjacency with said surface and including first and second marker pins having a predetermined pin-to-pin spacing, each having an impacting tip drivably movable into said surface in response to a pin drive input;

a translation drive assembly responsive to position signals for moving said positioning component to successive positions orienting said first and second marker pins at locations corresponding with a said pixel;

marker pin drive means responsive to pin actuation signals for providing said pin drive input; and control means responsive to the value of said initial, user selected pixel-to-pixel spacing and the value of said pin-to-pin spacing to adjust said initial pixel-to-pixel spacing to derive an adjusted pixel-to-pixel spacing, said adjustment being an amount sufficient to constitute the quotient of said value of said pin-to-pin spacing divided by said adjusted pixel-to-pixel spacing to be substantially an integer, for deriving said pin actuation signals and said position signals to effect the formation of said characters exhibiting said adjusted said pixel-to-pixel spacing.

12. The apparatus of claim 11 in which said control means is responsive to successively add a predetermined spacing increment to said initial, user selected pixel-to-pixel spacing until said integer is present within a predetermined tolerance.

13. The apparatus of claim 12 in which said spacing increment is about 0.00001 inch.

14. The apparatus of claim 12 in which said tolerance is less than about 0.05.

15. The apparatus of claim 12 in which said tolerance is about 0.01.

16. The apparatus of claim 11 in which:

said translation drive assembly comprises:

a first stepper motor mounted upon said housing and responsive to said position signals to provide a transverse drive output;

a first transmission assembly connected in driven relationship with said transverse drive output and in rotational drive relationship with said translation mechanism drive input for effecting the transverse directional movement of said positioning component;

a second stepper motor mounted upon said housing and responsive to said position signals to provide a vertical drive output; and a second transmission assembly connected in driven relationship with said vertical drive output and in rotational drive relationship with said translation mechanism drive input for effecting the vertical directional movement of said positioning component.

17. The method for marking a surface in response to data inputs with a string of pixel-based characters, each being formed within a matrix of rows and columns representing available pixel locations, comprising the steps of:

providing a housing;

providing a translation mechanism mounted upon said housing having a positioning component, said translation mechanism being actuable to move said positioning component in vertical and transverse directions between corresponding vertical end positions and transverse end positions;

providing a marker head assembly connected with said translation mechanism positioning component, having a confronting portion and an array of at least two marker pins, mutually spaced a predetermined pin-to-pin distance, each movable within a unique marking cell periphery defined by said positioning component transverse and vertical end positions, each having an impacting tip extensible from said confronting portion when actuated to form indentations in said surface at active pixel locations representing a component of said characters;

positioning said confronting portion in adjacency with said surface;

determining a locus of movement pattern for said array of marker pins representing a movement of each said marker pin to each said available pixel location of said matrix;

determining the said active pixel locations along said locus of movement pattern with respect to each said marker pin;

actuating said translation mechanism to move said positioning component in said vertical and transverse directions to cause said marker pins to move along said locus of movement pattern, the extent of movement in one said direction being uninterrupted and variable such that it is the distance required to move any said marker pin of said array in said one direction to a next encountered said active pixel; and actuating said marker pin to form a said indentation when said marker pin is located at a said active pixel location.

18. The method of claim 17 in which:

said locus of movement pattern is a raster pattern wherein said positioning component is moved in a predetermined transverse direction to cause said marker pins to move along one said row of said matrix and subsequently in an opposite said predetermined transverse direction and a said vertical direction to position said marker pins at a next adjacent said row of said matrix; and said movement in one direction is along said transverse direction.

19. The method of claim 17 in which said step for determining the said active pixel locations along said locus of movement pattern is carried out by setting a pin mask for each said active pixel for each row of said matrix with respect to each said marker pin.

20. The method of claim 17 in which:

said locus of movement pattern is a matrix pattern wherein said positioning component is moved in a predetermined vertical direction to cause said marker pins to move along one said column of said matrix and subsequently in a said transverse direction and a vertical direction opposite said predetermined vertical direction to move said marker pins along a next adjacent said column of said matrix; and said movement in one direction is along said vertical direction.

21. The method of claim 20 in which said step for determining the said active pixel locations along said locus of movement pattern is carried out by setting a pin mask for each said actice pixel for each column of said matrix with respect to each said marker pin.

22. Apparatus for marking objects at a surface thereof with a sequence of pixel-based characters formed by indentation, in response to data inputs, comprising:

a housing;

a translation mechanism mounted within said housing having a positioning component movable in vertical and transverse directions in response to a drive input;

a marker head assembly connectable with said positioning component, having a confronting portion positionable in adjacent with said surface and including an array of marker pins, each having an impacting tip and actuable to move into said surface in response to a pin drive input;

a translation drive assembly responsive to position signals for moving said positioning component to successive positions orienting said marker pins for forming said characters;

marker pin drive means responsive to pin actuation signals for providing said pin drive input; and control means responsive to said data inputs for providing said drive input to position said array of marker pins for the formation of portions of said pixel-based characters at a sequence of positions while said positioning component is stationary, said control means further deriving said pin actuation signals for each said position in a sequence providing a predetermined time interval therebetween to effect a timed succession of said actuations of said marker pins avoiding the simultaneous actuation of two more said marker pins at a said position.

23. The apparatus of claim 22 in which said predetermined interval is about 2 milliseconds.

24. Marking apparatus for forming characters at the surface of an object by the select application of current from a power source to the inputs of a sequence of inductive loads in response to control inputs, comprising:

a power application switch connectable between said power source and said inductive load inputs and responsive to a drive input to apply power source derived current to said inputs;

a pulse drive circuit responsive to a pulse width control input to derive said drive input;

a power selection switch network including a sequence of solid state selection switches, each having a selection output connectable in circuit completing relationship with said inductive load inputs and each having a gate input responsive to a gate input signal to transition from an initial to a gate condition to activate a corresponding said selection output thereof for effecting the said select application of current through a said inductive load;

sensing means coupled with each said power selection switch network selection output for deriving a sense signal corresponding with the comulative value of said current applied therethrough;

a gate drive network coupled with each said gate input of said solid state selection switches and responsive to said control inputs for deriving each said gate input signal;

summing means coupled with each said solid state, selection switch for deriving a summing signal having a value corresponding with the number of said solid state selection switches exhibiting a said gated condition; and a pulse width control network responsive to said summing signal and said sense signal for deriving said pulse width control input.

25. The marking apparatus of claim 24 including a post actuation switch coupled with each said gate input of said solid state selection switches and responsive at the termination of a said gate input signal to effect an assured transition from said gate condition to said initial condition.

26. The marking apparatus of claim 24 in which said summing means comprises a network of resistors selectively coupled with each said gate input of said solid state selection switches.

27. The marking apparatus of claim 24 in which said pulse width control network comprises:

a pulse generator for deriving a train of pulse signals; and a comparator responsive to said summing signal as a reference input and to said sense signal for effecting a pulse width modulation of said pulse signals to effect derivation of said pulse width control input.

28. The method for marking a surface with indentation formed substantially continuous line characters in response to data inputs representing characters formed of data defined pixels formed within a matrix of rows and columns and in correspondence with a select pixel density of indentation pixels comprising the steps of:

providing a housing;

providing a translation mechanism mounted upon said housing having a positioning component, said translation mechanism being actuable to move said positioning component in vertical and transverse directions between corresponding vertical end positions and a predetermined transverse distance between transverse end positions;

providing a marker head assembly connected with said translation mechanism positioning component, having a confronting portion and an array of at least two adjacent marker pins from first to last, mutually spaced a predetermined pin-to-pin distance, each from first to next to last being movable within a unique marking cell periphery defined by said pin-to-pin distance, each having a compacting tip extensible from said confronting portion when actuated to form indentations in said surface;

positioning said confronting portion in adjacency with said surface;

determining the number and matrix coordinate locations of said indentation pixels between adjacent said defined data pixels in correspondence with said select indentation pixel density;

actuating said translation mechanism to move to a predetermined said transverse end position;

forming at least first portions of said characters by actuating only said first marker pin at said matrix coordinate locations while actuating said translation mechanism to move said first marker pin only within said unique marking cell periphery associated therewith;

then actuating said translation mechanism to return to said predetermined transverse end position; and then forming at least second portions of said characters by actuating only the said marker pin next to said first marker pin at said matrix coordinate locations while actuating said translation mechanism to move said next marker pin only within said unique marking cell periphery associated therewith.

29. The method of claim 28 including the step of expanding the transverse extent of the said unique marking cell periphery of said last marker pin by an amount corresponding with the difference between said pin-to-pin distance and said predetermined transverse distance.

* * * * *